(12) United States Patent
Iizuka

(10) Patent No.: US 6,263,025 B1
(45) Date of Patent: Jul. 17, 2001

(54) MOTION VECTOR DETECTING APPARATUS

(75) Inventor: Akira Iizuka, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/702,680

(22) Filed: Nov. 1, 2000

Related U.S. Application Data

(62) Division of application No. 08/997,065, filed on Dec. 23, 1997, now Pat. No. 6,167,090.

(30) Foreign Application Priority Data

Dec. 26, 1996 (JP) ...................................................... 8-357004

(51) Int. Cl.$^7$ ............................................................. H04N 7/36
(52) U.S. Cl. ..................................... 375/240.16; 348/699
(58) Field of Search ...................... 375/240.16; 348/699; 382/232, 236, 238; H04N 7/36

(56) References Cited

U.S. PATENT DOCUMENTS

| | | | |
|---|---|---|---|
| 5,148,269 | * 9/1992 | de Haan et al. | 348/699 |
| 5,235,419 | * 8/1993 | Krause | 342/240.16 |
| 5,692,063 | * 11/1997 | Lee et al. | 382/236 X |
| 5,790,206 | * 8/1998 | Ju | 375/240.16 |
| 6,167,090 | * 12/2000 | Iizuka | 375/240.16 |

* cited by examiner

Primary Examiner—Howard Britton
(74) Attorney, Agent, or Firm—Connolly Bowe Lodge & Hutz

(57) ABSTRACT

A motion vector detecting apparatus generates motion vectors in units of subblocks (submacroblocks) and motion vectors in units of macroblocks on the basis of absolute difference of the individual pixels calculated by absolute difference calculating circuits. A switching arrangement switches the absolute difference calculating circuits to generate one of these two kinds of vectors. For generation of the motion vectors in units of subblocks, a motion vector search range can be shifted by adding an offset in accordance with, e.g., the motion of an image.

9 Claims, 18 Drawing Sheets

F I G. 8A
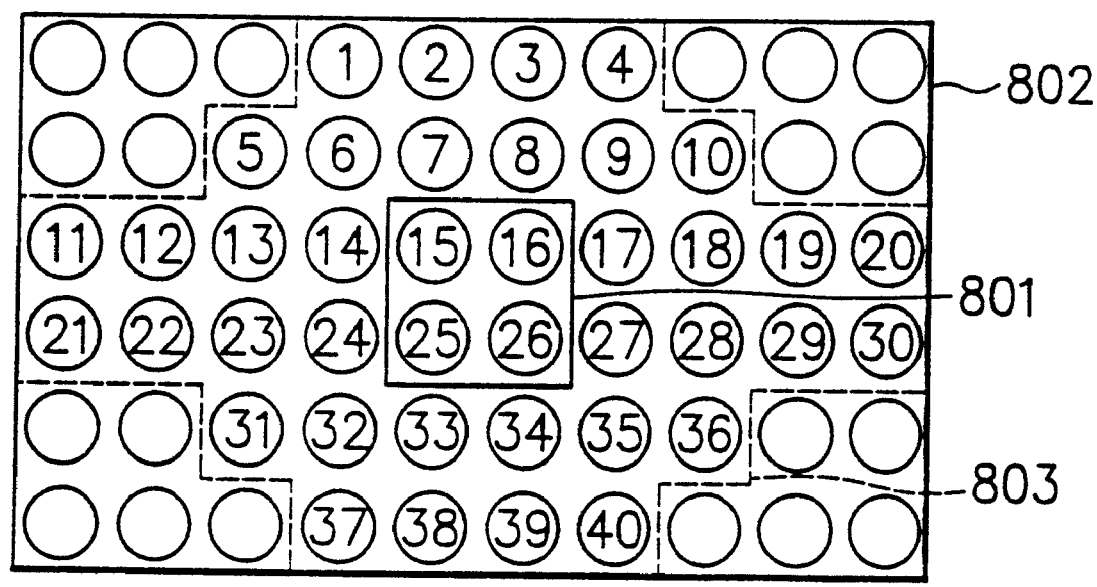

FM : FRAME MEMORY
AD : ABSOLUTE DIFFERENCE
MV : MOTION VECTOR
CB : CANDIDATE BLOCK
CTB : CODING TARGET BLOCK
RC : READ CIRCUIT

F I G. 10A
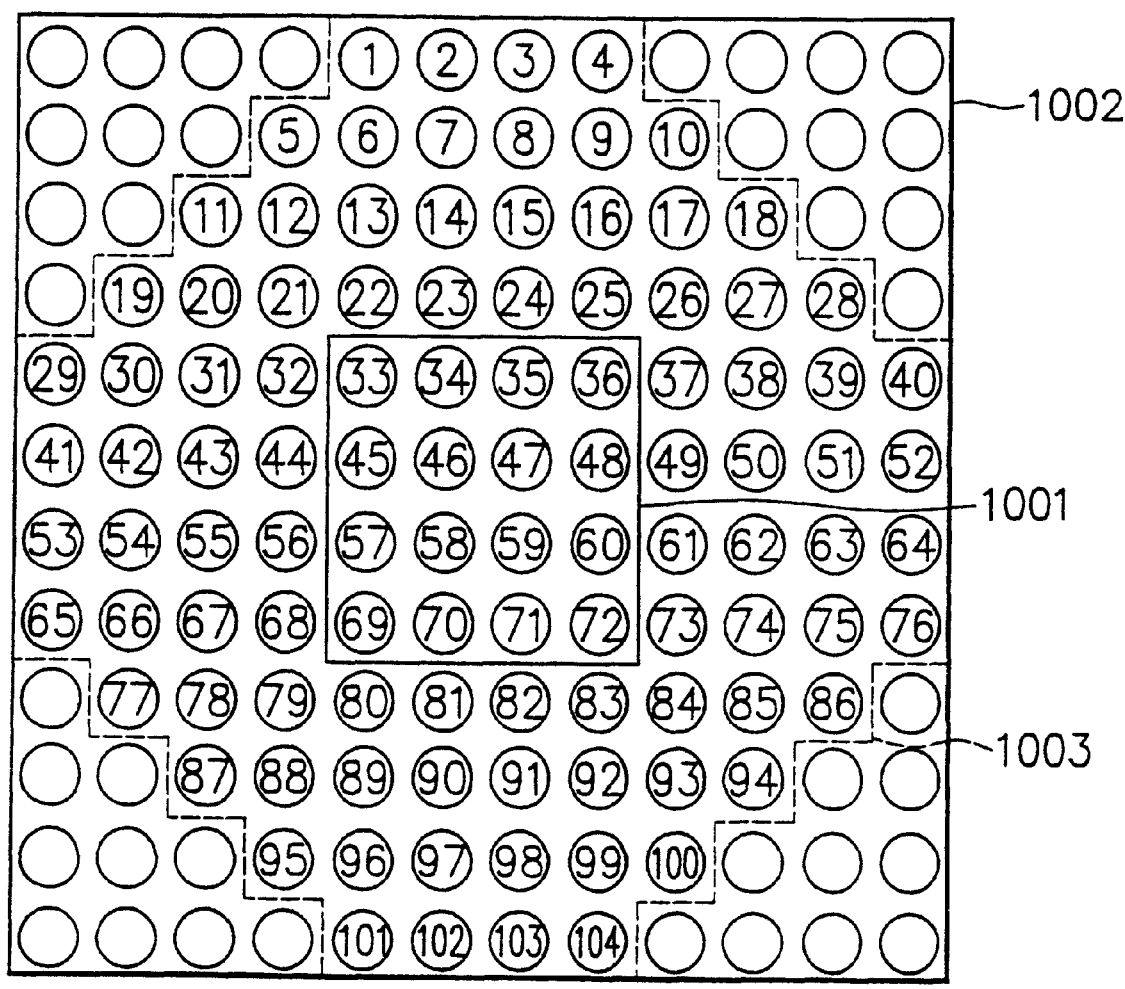

TO MPXs 1101a—1101l AND TO ADCs 1102m—1102p

MOTION VECTOR DETECTING APPARATUS

This application is a division of application Ser. No. 08/997,065 filed Dec. 23, 1997, now U.S. Pat. No. 6,167,090.

BACKGROUND OF THE INVENTION

1. Field of the Invention

The present invention relates to a motion vector detecting apparatus and a recording medium.

2. Description of the Related Art

In encoding a motion picture signal, a method (interframe coding) of encoding the difference between frames in view of high interframe correlation of a motion picture signal is often used to efficiently compress the information amount. That is, a first frame having no target frame from which the difference is calculated is directly encoded. However, for each frame following the first frame, the difference between the frame and an immediately preceding frame (reference frame) obtained by decoding the encoded information is calculated, and this difference is encoded.

In this method, the information amount can be reduced compared to a method in which all frames are entirely encoded. However, if there is a motion between frames the difference between which is to be calculated, the difference value is sometimes increased. Accordingly, the method cannot be said to be satisfactory in terms of compression of the information amount. To compress the information amount more efficiently by also taking account of these situations, therefore, a method called motion compensation (motion-compensated interframe coding) is used.

In interframe coding using no motion compensation, the difference between frames is calculated in a portion where the two frames to be compared have the same spatial coordinates. When motion compensation is used, on the other hand, it is not always necessary for the spatial coordinates between two frames to be the same. The frame motion is taken into consideration for calculating the difference between the frames with respect to a position in a reference frame to minimize the difference. A motion vector represents a shift of the coordinates of the position in the reference frame where the difference is to be calculated from the coordinates of the coding target position. This will be described below with reference to an accompanying drawing.

FIGS. 3A–3D are views for explaining motion-compensated interframe prediction and a motion vector. In FIGS. 3A–3D, reference numeral 301 denotes a reference frame; 302, a coding target frame in which only a white star ☆ moves and the background remains still. The coding target frame 302 is divided into a plurality of small blocks for performing motion-compensated interframe coding in units of blocks.

For example, in ITU-T recommended H. 261 or H. 263 as a moving picture communication coding standard or in MPEG1, MPEG2 or MPEG4 as a moving picture storage coding standard, a frame is encoded by dividing it into 16×16-pixel units called macroblocks. Reference numeral 303 denotes the way the coding target frame 302 is divided into a plurality of macroblocks.

Attention is focused on a block 303a, among other macroblocks of the coding target frame 303, where the white star ☆ exists. Reference numeral 304 denotes the same reference frame as 301. In the reference frame 304, a block having the same coordinates as the macroblock 303a is a block 304a. However, since there is a motion between these two frames, a block which minimizes the difference from the macroblock 303a is a block 304b. Hence, reference numeral 304c which represents a shift of the coordinates of the block 304b from the coordinates of the block 304a is a motion vector.

The efficiency of information compression is higher when the difference between the macroblock 303a in the coding target frame and the block 304b in the reference frame and the motion vector 304c are encoded than when the difference between the macroblock 303a in the coding target frame and the block 304a in the reference frame is encoded.

One method often used as a method for detecting this motion vector is a block matching method. In this method, a search range within which a motion vector is detected is previously set around the position of a coding target block.

The sum of absolute difference (SAD) between pixels in the coding target block and pixels in each of blocks corresponding to all candidate vectors in this search range is calculated. A candidate block having the minimum sum is bused as a reference block (corresponding to the block 304b in FIG. 3C). This method will be described below with reference to an accompanying drawing.

FIGS. 4A and 4B are views for explaining the block matching method. For the sake of simplicity, it is assumed that a coding target block has 2×2 pixels and a search range has +2 pixels in each of upper, lower, left and right directions in addition to the coding target block. In FIG. 4A, reference numeral 401 denotes the position of a coding target block in a coding target frame; 402, a search range in an immediately preceding reference frame; and in FIG. 4B, 403 to 427, blocks corresponding to all candidate vectors in the search range 402. Also, each number in the circles indicates a pixel number.

In this example case, the SAD of pixels in the coding target block 401 and pixels at the corresponding positions in each of the candidate blocks 403 to 427 is calculated. In the case of the upper left candidate block 403, $$|a15-b1|+|a16-b2|+|a21-b7|+|a22-b8|$$

is calculated. In this expression, a is the value of a coding target pixel, b is the value of a reference pixel, and ** corresponds to a pixel number in FIGS. 4A and 4B. A similar operation is performed for the other candidate blocks 404 to 427, and a block having the minimum sum is used as a reference block.

As described above, the compression method using a motion vector also takes account of a faster motion of an image in a frame. Accordingly, to increase the accuracy of motion vector detection, i.e., to detect a reference block which minimizes the SAD of pixels between positions in that block and a coding target block, it is necessary to expand the search range so that a larger number of candidate vectors are included.

When the search range is expanded, however, the motion search operation amount is increased accordingly. This undesirably increases the time required to detect a motion vector.

SUMMARY OF THE INVENTION

It is an object of the present invention to increase the motion vector detection accuracy, without increasing the motion search operation amount (without increasing the time required for the operation), in a coding method such as H. 261, H. 263, MPEG1, MPEG2 or MPEG4 which performs motion vector detection.

A motion vector detecting apparatus of the present invention calculates an absolute difference between each pixel value in a coding target block and each pixel value in a block as a candidate for a reference block in a motion vector search range, sums the calculated absolute difference of individual pixels for each of a plurality of subblocks obtained by dividing the coding target block, further sums the sum results, and obtains a motion vector on the basis of one of the sum results in units of subblocks and the total sum result.

According to another aspect of the present invention, the apparatus comprises switching means for switching connections with respect to input of each pixel value in a block as a candidate for the reference block, in accordance with whether a motion vector in the coding target block or motion vectors in units of subblocks are to be obtained, the connections comprising a connection in which all of pixel absolute difference calculating means provided in units of pixels in the coding target block are connected, and another connection in which only pixel absolute difference calculating means in one subblock in the coding target block is connected separately from others.

According to still another aspect of the present invention, the apparatus further comprises offset means for adding a predetermined offset to a motion vector search range when motion vectors in units of subblocks are obtained, to shift a motion vector search range used in obtaining motion vectors in units of subblocks.

According to still another aspect of the present invention, a motion vector detecting apparatus calculates an absolute difference between each pixel value in a coding target block and each pixel value in a block as a candidate for a reference block in a motion vector search range, and generates a motion vector by determining the reference block on the basis of the calculation result, wherein the calculation is performed by setting a range formed by excluding regions far from the coding target block from a predetermined rectangular region including the coding target block as the motion vector search range.

According to still another aspect of the present invention, a motion vector detecting apparatus generating a motion vector by using a block matching method comprises a shift register set in which a plurality of shift registers are connected in series, each pixel value in a motion vector search range is sequentially transferred from the first to the last of the shift registers connected in series, and outputs from the shift registers are independently led out, a plurality of selecting means provided in a one-to-one correspondence with predetermined pixel positions in a coding target block to receive a plurality of outputs from predetermined shift registers in the shift register set and selectively output one of the inputs, pixel absolute difference calculating means provided in units of pixels to calculate an absolute difference between each pixel value in the coding target block and each pixel value, supplied from the selecting means and the shift register set, in a block as a candidate for a reference block in the motion vector search range, and control means for controlling the selecting means by a predetermined control signal.

According to still another aspect of the present invention, in a motion vector detecting apparatus for calculating an absolute difference between each pixel value in a coding target block and each pixel value in a block as a candidate for a reference block in a motion vector search range, summing the calculated absolute difference of individual pixels for each of a plurality of subblocks obtained by dividing the coding target block, further summing the sum results, and obtaining a motion vector on the basis of one of the sum results in units of subblocks and the total sum result, a computer readable recording medium records a program for allowing a computer to realize a function of switching connections of pixel absolute difference calculating means with respect to input of each pixel value in a block as a candidate for the reference block, in accordance with whether a motion vector in the coding target block or motion vectors in units of subblocks are to be obtained, and obtaining a motion vector in accordance with selection of one of the sum results in units of subblocks and the total sum result.

According to still another aspect of the present invention, the recording medium further records a program for allowing a computer to realize a function of shifting the motion vector search range by adding a predetermined offset in accordance with motion of an image when motion vectors in units of subblocks are obtained, thereby reading out each pixel value in the motion vector search range.

According to still another aspect of the present invention, in a motion vector detecting apparatus for calculating an absolute difference between each pixel value in a coding target block and each pixel value in a block as a candidate for a reference block in a motion vector search range, and generating a motion vector by determining the reference block on the basis of the calculation result, a computer readable recording medium records a program for allowing a computer to realize a function of performing the calculation by setting a range formed by excluding regions far from the coding target block from a predetermined rectangular region including the coding target block as the motion vector search range.

The present invention comprises the technical means described above. Therefore, motion vectors in units of subblocks can be obtained from the calculation results from a plurality of subblock summing means by using the absolute difference of individual pixels calculated by the absolute difference calculating means. Simultaneously, a motion vector in units of macroblocks can be obtained from the calculation result from the block summing means which further sums the sum results in units of subblocks.

Consequently, both of a motion vector in units of macroblocks and motion vectors in units of subblocks can be obtained by a single motion vector detecting unit. When motion vectors in units of subblocks are to be obtained, this processing can be performed by shifting a motion vector search range by adding an offset in accordance with, e.g., the motion of an image.

According to another characteristic feature of the present invention, the apparatus includes the switching means for switching processing in which all of absolute difference calculating means in a coding target block are connected and processing in which only absolute difference calculating means in one subblock is connected separately from others. Therefore, in obtaining motion vectors in units of subblocks, pixel values of candidate blocks can be independently input in units of subblocks. Consequently, even if an offset to be applied differs in every subblocks, appropriate pixel values can be respectively input for individual subblocks.

According to still another characteristic feature of the present invention, calculations are performed by setting a range formed by excluding regions far from a coding target block from a predetermined rectangular range including the coding target block as a motion vector search range. Therefore, even when a search range as a rectangular region is made larger than usual, it is possible to prevent an increase in the number of blocks to be subjected to absolute difference calculations to determine a reference block among candidates in the large rectangular region.

BRIEF DESCRIPTION OF THE DRAWINGS

FIGS. 8A and 8B are views for explaining another characteristic feature of the motion vector detecting apparatus according to the second embodiment of the present invention;

FIGS. 10A and 10B are views for explaining one example of block matching methods performed by the motion vector detecting apparatus according to the second embodiment of the present invention;

FIGS. 14A–14I are views showing the way the state of the shift register set transits when search data input processing is continued.

DETAILED DESCRIPTION OF THE PREFERRED EMBODIMENTS

One embodiment of the present invention will be described below with reference to the accompanying drawings.

In coding methods such as H. 261, H. 263, MPEG1, MPEG2 and MPEG4, coding processing (including, e.g., DCT processing) after motion vector detection is generally performed in units of 8×8 pixels called subblocks obtained by further dividing a 16×16-pixel macroblock into four blocks. Especially in H. 263 and MPEG4, not only a motion vector in units of macroblocks but also a motion vector in units of subblocks can be used. Therefore, it is possible to obtain these two kinds of motion vectors and choose one having a higher efficiency. This motion vector in units of subblocks will be described below with reference to an accompanying drawing.

Figure 5A:
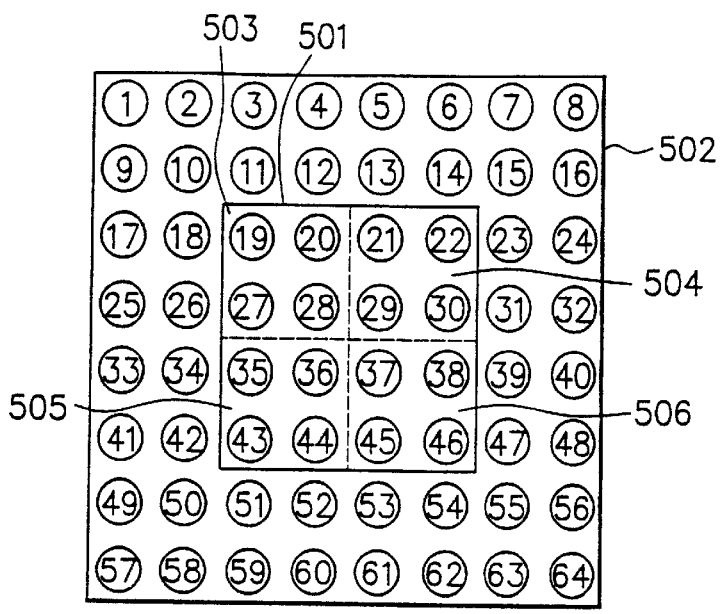
FIGS. 5A–5E are views for explaining a motion vector in units of subblocks.
Figure 5B:
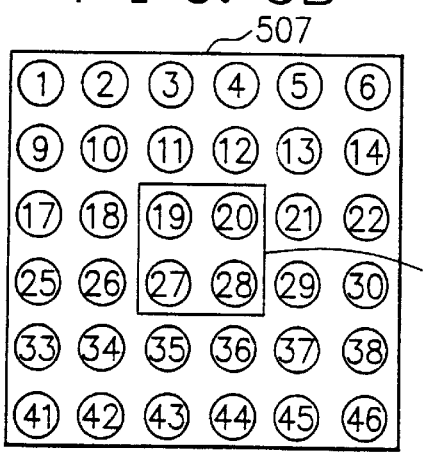
Figure 5C:
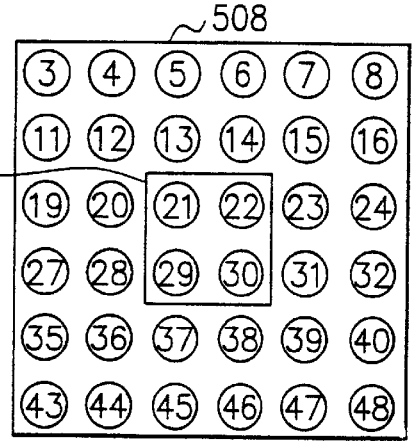
Figure 5D:
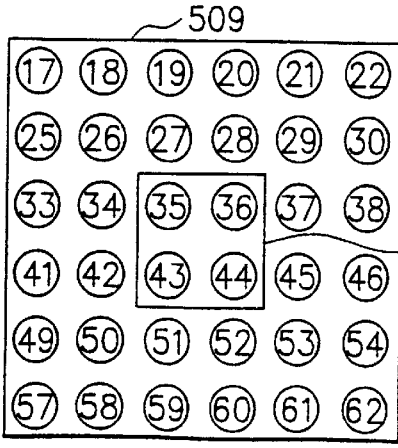
Figure 5E:
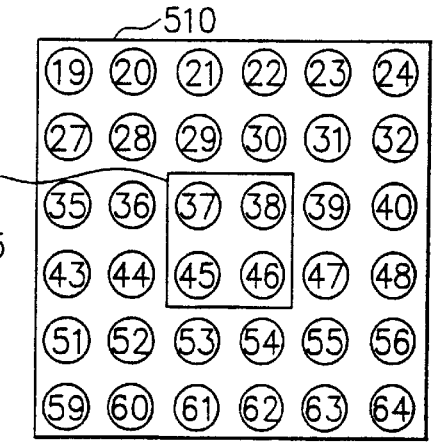

FIGS. 5A–5E are views for explaining a motion vector in units of subblocks. For the sake of simplicity, it is assumed that a coding target macroblock has 4×4 pixels and a search range has +2 pixels in each of upper, lower, left and right directions in addition to the coding target macroblock. In FIG. 5A, reference numeral 501 denotes a coding target macroblock in a coding target frame; 502, a search range in units of macroblocks in an immediately preceding reference frame; and 503 to 506, subblocks obtained by dividing the coding target macroblock 501 into four blocks. Each subblock has 2×2 pixels.

In the case of the upper left subblock 503 in this example, a motion vector in units of subblocks is the result of motion vector detection performed in a search range 507 having +2 pixels in each of upper, lower, left and right directions in addition to the subblock 503. A method of detecting this motion vector is the same as explained previously with reference to FIGS. 4A and 4B. Analogously, motion vectors in the subblocks 504 to 506 are the results of motion vector detection performed in search ranges 508 to 510 of these subblocks.

Additionally, in H. 263 and MPEG4, the center of a search range for motion vector detection in units of subblocks need not be the same as the position of a coding target subblock; i.e., the center of a search range can be moved a predetermined amount by adding an offset. This will be described below with reference to an accompanying drawing.

Figure 6:
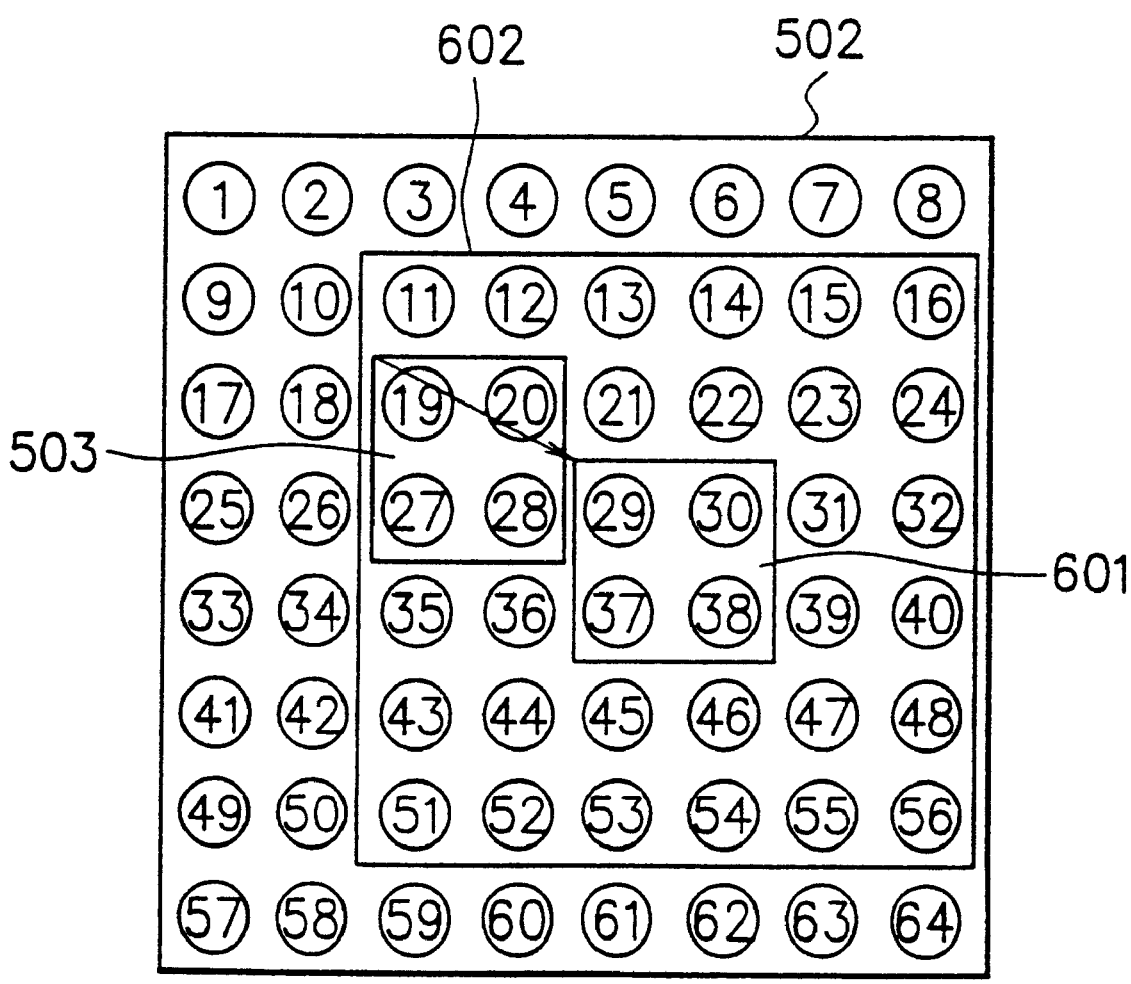
FIG. 6 is a view for explaining motion vector detection when an offset is added to a search range in units of subblocks.

FIG. 6 is a view for explaining motion vector detection when an offset is added to a search range in units of subblocks. In FIG. 6, reference numeral 503 denotes the position of the upper left coding target subblock shown in FIG. 5A. In H. 263 and MPEG4, the origin of a search range for motion vector detection in this coding target subblock 503 can be shifted to a position 601, for example, by adding an offset, and a search range in units of subblocks can also be shifted to a position 602 accordingly.

Note that the value of an offset is not limited in the search range 502 in units of macroblocks. Therefore, depending on the offset value, the search range 602 in units of subblocks may sometimes deviate from the search range 502 in units of macroblocks. That is, even if the same image as in a coding target subblock does not exist in a search range at the original position because the image moves very fast, the search range can be shifted by adding an offset predicted from motions in surrounding blocks. Consequently, an optimum block containing the identical image with that in the coding target subblock can be used as a reference subblock.

It is only recently that H. 263 and MPEG4 which can also use a motion vector in units of subblocks have been standardized or are working to standardization, so not many products using these methods exist. Accordingly, it is a subject in the future to determine the arrangement of an apparatus for obtaining both a motion vector in units of macroblocks and a motion vector in units of subblocks and selecting one with a higher efficiency.

It is, therefore, the first object of the present invention to provide a motion vector detecting apparatus capable of detecting a motion vector in units of macroblocks and a motion vector in units of subblocks with a simple arrangement, as a leading application of H. 263 and MPEG4 which can also use a motion vector in units of subblocks combined with the offset. To this end, the present invention proposes the first embodiment to be described below.

First Embodiment

Figure 1:
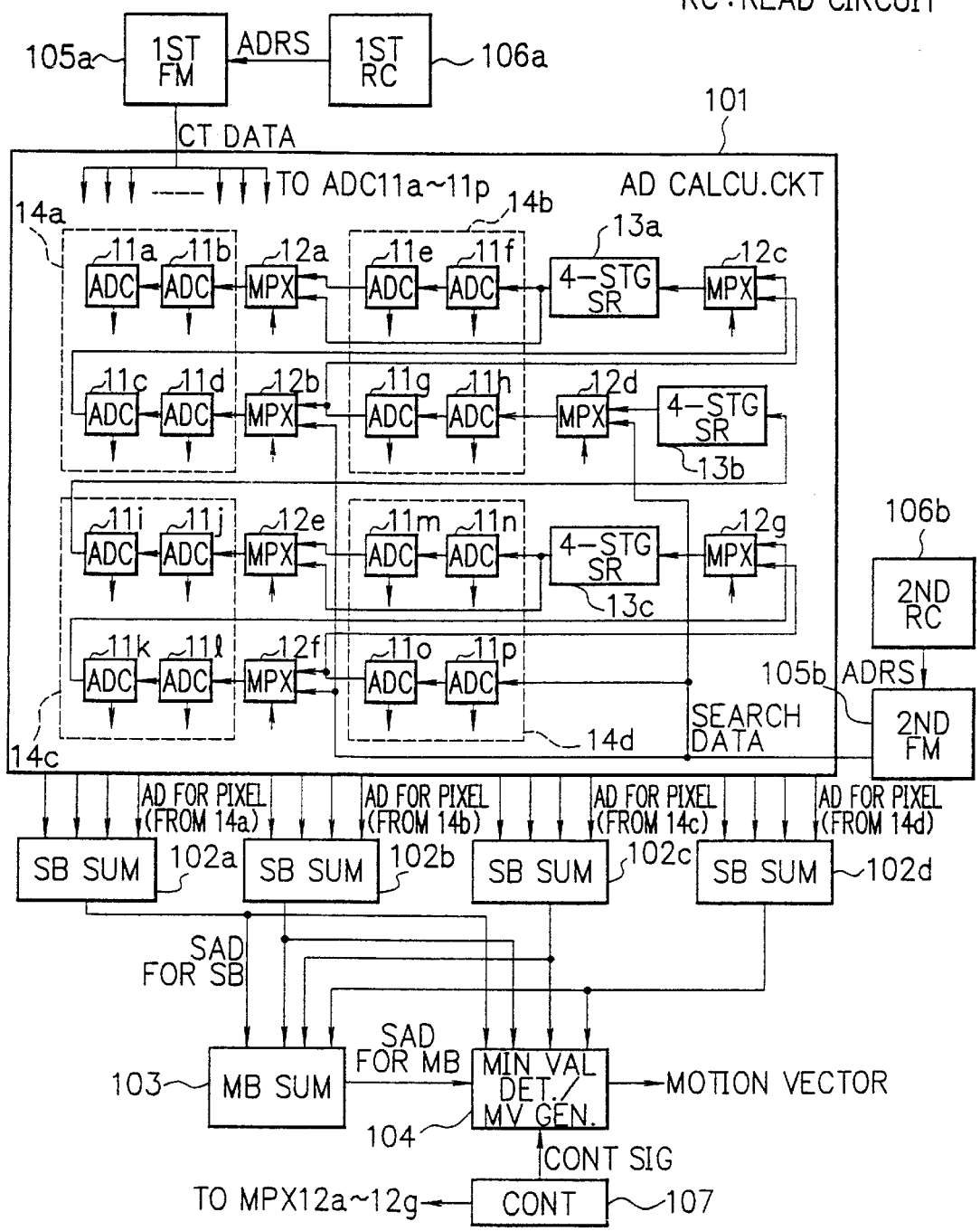
FIG. 1 is a block diagram showing the arrangement of the major components of a motion vector detecting apparatus according to the first embodiment of the present invention.

FIG. 1 is a block diagram showing the arrangement of the main components of a motion vector detecting apparatus according to the present invention. For the sake of simplicity, it is assumed that, as shown in FIG. 5A, a coding target macroblock has 4×4 pixels and a search range in units of macroblocks has +2 pixels in each of upper, lower, left and right directions in addition to the coding target macroblock.

In FIG. 1, reference numeral 101 denotes an absolute difference calculating circuit; 102a to 102d, subblock summing circuits; 103, a macroblock summing circuit; 104, a minimum value determining/motion vector generating circuit; 105a and 105b, frame memories; 106a and 106b, read circuits; and 107, a control circuit.

An image of a coding target frame is stored in the first frame memory 105a. From this image, pixel values (to be referred to as coding target macroblock data hereinafter) in a coding target macroblock are read out in accordance with output addresses from the first read circuit 106a and supplied to the absolute difference calculating circuit 101. Also, an image of an immediately preceding reference frame of the coding target frame is stored in the second frame memory 105b. From this image, pixel values (to be referred to as search data hereinafter) in a search range are read out in accordance with output addresses from the second read circuit 106b and supplied to the absolute difference calculating circuit 101.

The absolute difference calculating circuit 101 incorporates pixel absolute difference calculating circuits (to be referred to as ADCs hereinafter) 11a to 11p, multiplexers (to be referred to as MPXs hereinafter) 12a to 12g and four-stage shift registers 13a to 13c in each of which four shift registers are connected in series. The positions of the ADCs 11a to 11p correspond to the positions of pixels in a coding target macroblock in an actual frame. Accordingly, portions 14a to 14d enclosed by the dotted lines in FIG. 1 correspond to the positions of subblocks in a macroblock.

Figure 2:
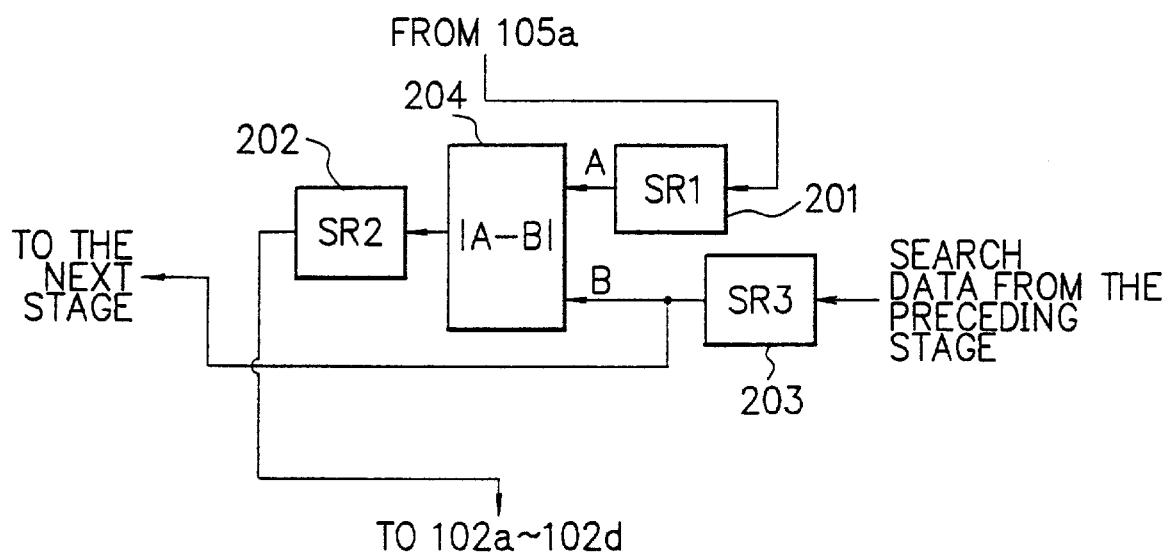
FIG. 2 is a diagram showing the arrangement of a pixel absolute difference calculating circuit (ADC) shown in FIG. 1.
Figure 3A:
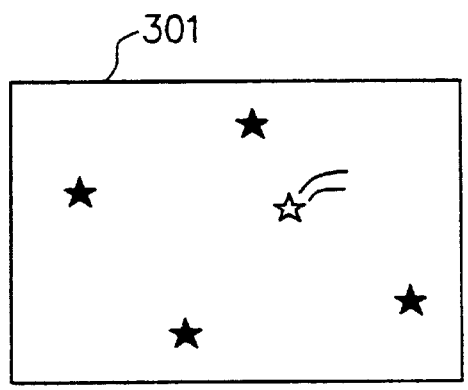
FIGS. 3A–3D are views for explaining motion-compensated interframe prediction and a motion vector.
Figure 3B:
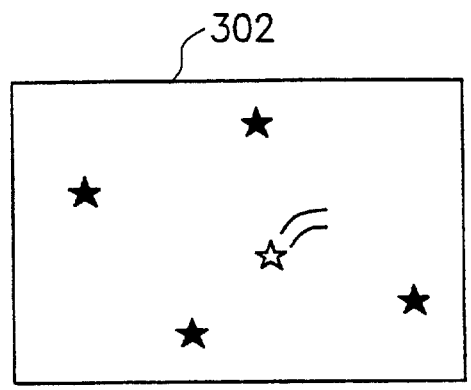
Figure 3C:
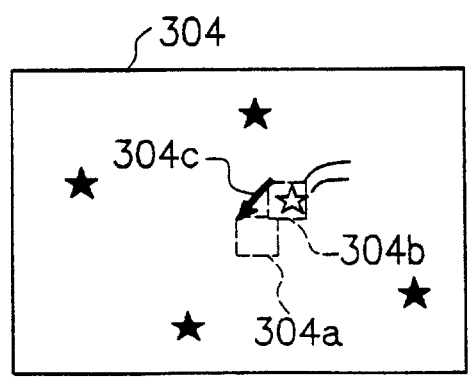
Figure 3D:
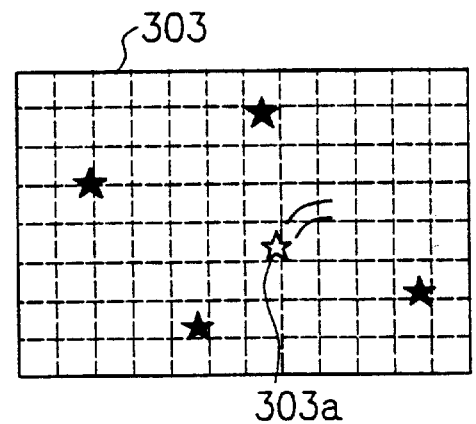

FIG. 2 shows the internal arrangement of the ADCs 11a to 11p. In FIG. 2, reference numerals 201 to 203 denote shift registers; and 204, a calculating circuit. The first shift register 201 holds one pixel of the coding target macroblock data read out from the first frame memory 105a. The third shift register 203 holds one pixel of the search data transferred from various circuits in the preceding stage.

The calculating circuit 204 calculates an absolute difference |A−B| between one-pixel coding target macroblock data A held in the first shift register 201 and one-pixel search data B held in the third shift register 203, and holds the calculation result in the second shift register 202. The one-pixel absolute difference held in the second shift register 202 is output to a corresponding one of the four subblock summing circuits 102a to 102d. The search data B held in the third shift register 203 is output to the next stage at the same time the absolute difference is output.

Since each of the ADCs 11a to 11p has the arrangement as shown in FIG. 2, the input search data is sequentially transferred from right to left in each line of the absolute difference calculating circuit 101. Output search data from the ADCs 11c, 11i and 11k at the leftmost positions in the second and subsequent lines are respectively supplied to the rightmost positions in their upper lines. The three four-stage shift registers 13a to 13c are provided closer to the input side (right side) than the ADCs in the three lines except the lowermost line.

In this embodiment, the search range in units of macroblocks has eight pixels in the horizontal direction, whereas each candidate block in the search range has four pixels in the same direction, i.e., has pixels fewer by four than the pixels of the search range. Therefore, each of the three four-stage shift registers 13a to 13c provided in the individual lines functions to store four pixels of search data per line which are not used as pixel values in a candidate block.

The MPX 12a is arranged between the subblocks 14a and 14b and selectively outputs one of the outputs from the ADC 11e and the four-stage shift register 13a. The MPX 12b is arranged between the subblocks 14a and 14b and selectively outputs one of the outputs from the ADC 11g and the second frame memory 105b.

The MPX 12c is arranged before the four-stage shift register 13a and selectively outputs one of the outputs from the ADCs 11c and 11g. The MPX 12d is arranged before the ADC 11h and selectively outputs one of the outputs from the four-stage shift register 13b and the second frame memory 105b.

The MPX 12e is arranged between the subblocks 14c and 14d and selectively outputs one of the outputs from the ADC 11m and the four-stage shift register 13c. The MPX 12f is arranged between the subblocks 14c and 14d and selectively outputs one of the outputs from the ADC 11o and the second frame memory 105b.

The MPX 12g is arranged before the four-stage shift register 13c and selectively outputs one of the outputs from the ADCs 11k and 11o.

The MPXs 12a to 12g described above can be switched in accordance with a control signal from the control circuit 107. When a motion vector in units of macroblocks is to be obtained, all the MPXs select their upper inputs. A selection state when a motion vector in units of subblocks is to be obtained will be described below.

That is, when a motion vector in units of macroblocks is to be obtained, the sixteen ADCs 11a to 11p are connected in series with the three four-stage shift registers 13a to 13c interposed between them, and search data is sequentially transferred from the lower right ADC 1ip to the upper left ADC 11a. On the other hand, when a motion vector in units of subblocks is to be obtained, four ADCs are connected in series in units of subblocks, and search data for each subblock is sequentially transferred from the lower right ADC to the upper left ADC in the subblock.

Each of the subblock summing circuits 102a to 102d calculates the SAD of pixels calculated in a corresponding one of the subblocks 14a to 14d, and supplies the result to the macroblock summing circuit 103 and the minimum value determining/motion vector generating circuit 104. The macroblock summing circuit 103 sums all the SAD in units of subblocks supplied from the subblock summing circuits 102a to 102d, and supplies the result to the minimum value determining/motion vector generating circuit 104.

The minimum value determining/motion vector generating circuit 104 determines the minimum value of the SAD supplied in units of candidate blocks from the subblock summing circuits 102a to 102d or the macroblock summing circuit 103.

The minimum value determining/motion vector generating circuit 104 generates a motion vector with adoption of a candidate block having the minimum sum to be a reference block.

In obtaining a motion vector in units of macroblocks, one motion vector is obtained by using the sum from the macroblock summing circuit 103. In obtaining a motion vector in units of subblocks, four motion vectors are obtained by using the sum from the subblock summing circuits 102a to 102d. Which sum is to be used by the minimum value determining/motion vector generating circuit 104 is controlled by a control signal supplied from the control circuit 107.

The operation of the motion vector detecting apparatus according to this embodiment with the above arrangement will be described below.

First, coding target macroblock data from the first frame memory 105*a* is input to the absolute difference calculating circuit 101, and the data of each pixel is held in the first shift register 201 in a corresponding one of the ADCs 11*a* to 11*p*. This coding target macroblock data is kept held in the first shift register 201 during processing of the same macroblock.

Note that it is only necessary to completely input the coding target macroblock data from the first frame memory 105*a* before the first data arrives at the upper left ADC 11*a* in FIG. 1 when the data in a search range is input as will be described below.

Next, the data in a search range is input to the absolute difference calculating circuit 101. An operation of obtaining a motion vector in units of macroblocks will be described first. If this is the case, search data in units of macroblocks is input to the absolute difference calculating circuit 101. Since ±2 pixels are searched for a coding target macroblock having 4×4 pixels, the size of the search data is 8×8 pixels (502 in FIG. 5A).

All the MPXs 12*a* to 12*g* in FIG. 1 select the upper inputs in accordance with a control signal from the control circuit 107. Consequently, the four-stage shift registers 13*a* to 13*c* and the ADCs 11*a* to 11*p* in the absolute difference calculating circuit 101 are connected in series from the lowermost line to the uppermost line and from right to left in each line.

Figure 4A:
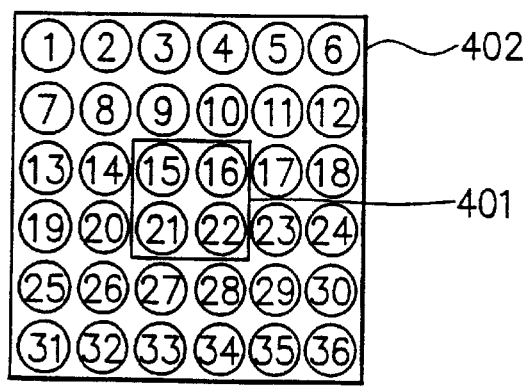
FIGS. 4A and 4B are views for explaining a block matching method as one method of detecting a motion vector.
Figure 4B:
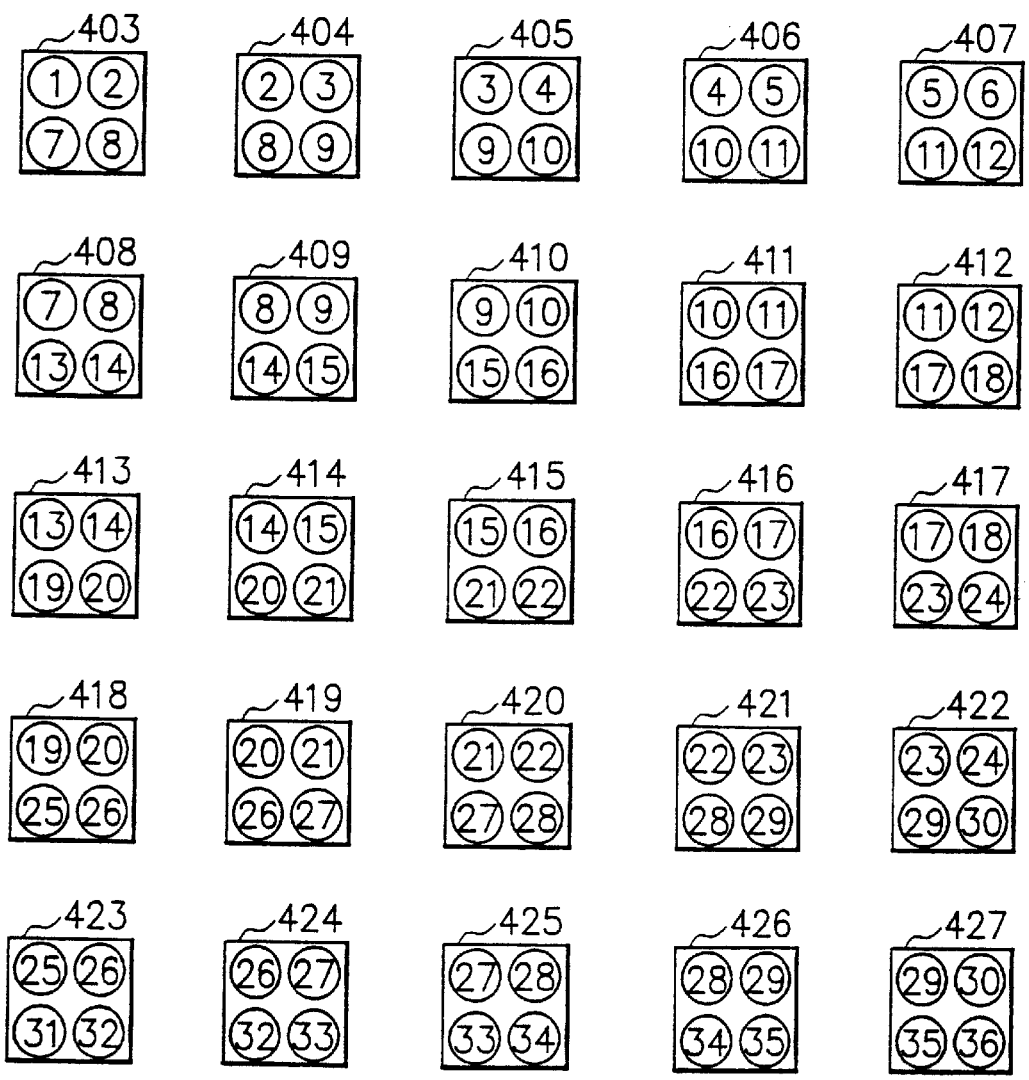

When the search data (the data in the search range 502 in FIG. 5A) in units of macroblocks is input in the raster scan order from the input side of the last line, the data of the upper left candidate block (including sixteen pixels of pixel numbers 1 to 4, 9 to 12, 17 to 20 and 25 to 28 and corresponding to a candidate block 403 in FIG. 4B) is input to the ADCs 11*a* to 11*p* at the time the first data (the data of pixel number 1 in the upper left corner of the search range) arrives at the upper left ADC 11*a*.

The calculating circuit 204 in each of the ADCs 11*a* to 11*p* calculates the absolute difference between the coding target macroblock data and the search data in units of macroblocks for each pixel, and the second shift register 202 holds the calculation result. These absolute difference are input to and summed by the subblock summing circuits 102*a* to 102*d* corresponding to the subblocks 14*a* to 14*d*, thereby obtaining the SAD in units of subblocks.

The SAD in units of subblocks calculated by the subblock summing circuits 102*a* to 102*d* are input to and summed by the macroblock summing circuit 103, thereby obtaining the SAD in units of macroblocks. The SAD in units of macroblocks thus calculated is input to the minimum value determining/motion vector generating circuit 104 and held in an internal register (not shown).

Subsequently, one pixel of the next search data is input from the input side of the last line. This is equivalent to inputting the data of the next candidate block (corresponding to a candidate block 404 in FIG. 4B) to the ADCs 11*a* to 11*p*. As in the above case, the SAD in units of macroblocks is calculated and input to the minimum value determining/motion vector generating circuit 104. The minimum value determining/motion vector generating circuit 104 compares the presently input SAD with the SAD held in the internal register (not shown) in the immediately preceding processing, and holds the smaller value in the register.

In the same manner as above, the search data is sequentially input from the input side of the last line, and the SAD in units of macroblocks are calculated. When five pixels of the search data are input from the timing at which the data of the first candidate block is input to the ADCs 11*a* to 11*p*, five candidate blocks (corresponding to candidate blocks 403 to 407 in FIG. 4B) in the same horizontal position are sequentially input to the ADCs 11*a* to 11*p*.

Input of the subsequent three pixels of the search data is irrelevant to the calculation of the SAD. When the next five pixels of the search data are sequentially input, five candidate blocks (corresponding to candidate blocks 408 to 412 in FIG. 4B) horizontally lower by one pixel than the previously input five candidate blocks are sequentially input to the ADCs 11*a* to 11*p*. When the search data is sequentially input in this manner, the search data of all the candidate blocks is sequentially input to the ADCs 11*a* to 11*p*.

The minimum value determining/motion vector generating circuit 104 performs the magnitude comparison and the data update processing to the register as described above each time the SAD in units of macroblocks is calculated for a candidate block, and finally determines a candidate block having the minimum SAD to be a reference block among other candidate blocks. The minimum value determining/motion vector generating circuit 104 generates a motion vector corresponding to the determined reference block and externally outputs the motion vector as a motion vector in units of macroblocks.

If all the origins of search ranges for detecting motion vectors in units of subblocks are in the same positions as coding target subblocks (if there is no offset), the minimum value determining/motion vector generating circuit 104 can obtain four motion vectors in units of subblocks by performing processing similar to the processing in units of macroblocks described above by using the SAD in units of subblocks calculated by the subblock summing circuits 102*a* to 102*d*.

If there is no offset for a search range as described above, both of a motion vector in units of macroblocks and motion vectors in units of subblocks can be obtained without switching the MPXs 12*a* to 12*g*. Accordingly, the MPXs 12*a* to 12*g* need to be arranged in constructing a simple system not taking account of an offset at all.

Also, even if there is an offset, if this offset is common to the subblocks 14*a* to 14*d*, motion vectors in units of subblocks can be obtained by again inputting search data in units of macroblocks corresponding to the offset under the control of the second read circuit 106*b*.

An operation of obtaining motion vectors in units of subblocks when the subblocks 14*a* to 14*d* have different offsets will be described below. If this is the case, search data can sometimes entirely differ from one subblock to another. Therefore, search data is independently input in units of subblocks from the second frame memory 105*b* to the absolute difference calculating circuit 101. The second read circuit 106*b* controls this search data input.

First, an operation of obtaining a motion vector in the upper left subblock 14*a* will be described. In this operation, the MPXs 12*a* and 12*b* select the lower inputs, the MPX 12*c* selects the upper input, and the other MPXs 12*d* to 12*g* are disregarded (don't care). Consequently, search data read out in units of subblocks from the second frame memory 105*b* is directly input to the ADC 11*d*, and output search data from the ADC 11*c* is input to the ADC 11*b* via the MPX 12*c*, the four-stage shift register 13*a* and the MPX 12*a*.

This is equivalent to reducing the connection of the ADCs 11*a* to 11*p* previously constituted to detect a motion vector in units of macroblocks by 4×4 pixels, to the connection of the ADCs 11a to 11d corresponding to 2×2 pixels. Therefore, search data in units of subblocks (since ±2 pixels are searched for coding target subblock data having 2×2 pixels, the size of the search data is 6×6 pixels; see the search range 507 in FIG. 5B) is input in the raster scan order to the absolute difference calculating circuit 101. The minimum value determining/motion vector generating circuit 104 processes only the output from the subblock summing circuit 102a. Consequently, a motion vector in units of subblocks can be obtained.

In the same manner as above, a motion vector in units of subblocks can be obtained for each of the upper right, lower left and lower right subblocks 14b, 14c and 14d. To obtain a motion vector in the upper right subblock 14b, the MPXs 12c and 12d select the lower inputs, and the other MPXs are disregarded (don't care). In this state, the minimum value determining/motion vector generating circuit 104 processes only the output from the subblock summing circuit 102b.

To obtain a motion vector in the lower left subblock 14c, the MPXs 12e and 12f select the lower inputs, the MPX 12g selects the upper input, and the other MPXs are disregarded (don't care). In this state, the minimum value determining/ motion vector generating circuit 104 processes only the output from the subblock summing circuit 102c.

To obtain a motion vector in the lower right subblock 14d, the MPX 12g selects the lower input, and the other MPXs are disregarded (don't care). In this state, the minimum value determining/motion vector generating circuit 104 processes only the output from the subblock summing circuit 102d.

By the above operation, motion vectors in units of subblocks can be detected for all subblocks.

The control circuit 107 controls the series of operations described above, i.e., the read of coding target macroblock data from the first frame memory 105a, the read of search data from the second frame memory 105b, the switching of the MPXs 12a to 12g, and the processing in the minimum value determining/motion vector generating circuit 104.

Although the control circuit 107 can be constituted by hardware, the control circuit 107 can also be constituted by a microcomputer including, e.g., a CPU, a ROM and a RAM. If this is the case, a program describing a sequence for performing the series of operations as described above is stored in the ROM, and the CPU operates in accordance with the program stored in the ROM. The ROM storing the working program of the CPU constitutes a recording medium of the present invention.

It is also possible to connect a hard disk to the microcomputer via a peripheral interface and store the working program of the CPU in this hard disk. The working program can be externally supplied to the hard disk. If this is the case, the hard disk and a means for supplying the working program, e.g., a recording medium storing the working program, also constitute the recording medium of the present invention.

As the recording medium for storing the working program, it is possible to use, e.g., a floppy disk, an optical disk, a magnetooptical disk, a CD-ROM, a magnetic tape and a nonvolatile memory card in addition to the ROM and the hard disk.

In this embodiment as described above, in a coding method such as H. 263 or MPEG4, motion vectors in units of subblocks are obtained by adding an offset to each subblock in accordance with, e.g., the motion of an image. Consequently, it is possible by expanding the search range to increase the motion vector detection accuracy and compress the information amount more efficiently without increasing the operation amount (without increasing the time required for the operation).

In the above embodiment, a case in which a coding target macroblock has 4×4 pixels and a search range in units of macroblocks has +2 pixels in each of upper, lower, left and right directions in addition to the coding target macroblock has been described for the sake of simplicity. However, the present invention is not limited to the above embodiment. As described in Description of the Related Art, a coding target macroblock is actually constituted by 16×16 pixels in H. 263 and MPEG4. Therefore, the ADCs, MPXs and the shift registers need only be constituted in accordance with the number of pixels.

In the above embodiment, both the outputs from the subblock summing circuits 102a to 102d and the output from the macroblock summing circuit 103 are input to the minimum value determining/motion vector generating circuit 104. Which information is to be used by the minimum value determining/motion vector generating circuit 104 is controlled by a control signal from the control circuit 107. However, the present invention is not restricted to the above embodiment. For example, the control circuit 107 may also control the subblock summing circuits 102a to 102d to selectively supply their outputs to the macroblock summing circuit 103 or the minimum value determining/motion vector generating circuit 104.

As has been described in detail above, the first embodiment of the present invention comprises a plurality of subblock summing means for summing absolute difference of individual pixels calculated by absolute difference calculating circuits in units of subblocks, block summing means for summing the calculation results from the subblock summing means, motion vector generating means for obtaining a motion vector on the basis of the calculation results from the subblock summing means or the calculation result from the block summing means and control means for performing control to determine the calculation result to be used. Therefore, motion vectors in units of subblocks can be obtained from the calculation results from the subblock summing means by using the absolute difference of individual pixels calculated by the absolute difference calculating means. At the same time, a motion vector in units of macroblocks can be obtained from the calculation result from the block summing means which further sums the sum results in the individual subblocks. Consequently, it is unnecessary to separately provide absolute difference calculating means to obtain a motion vector in units of macroblocks and motion vectors in units of subblocks. That is, these two kinds of motion vectors can be obtained with a simpler arrangement. Motion vectors can be obtained by shifting a motion vector search range in units of subblocks by adding an offset in accordance with, e.g., the motion of an image. Accordingly, the motion vector detection accuracy can be improved by expanding the search range without increasing the operation time.

The first embodiment further includes the switching means for performing switching between processing in which all of absolute difference calculating means in a coding target block are connected and processing in which only absolute difference calculating means in one subblock is connected separately from others. Therefore, in obtaining motion vectors in units of subblocks, pixel values in candidate blocks can be independently input in units of subblocks. Consequently, even if an offset to be applied differs in every subblocks, appropriate data can be respectively input for individual subblocks. Accordingly, even in constructing a coding system capable of adding different offsets to the search ranges for different subblocks, the motion vector detecting apparatus of the present invention can be applied to obtain both a motion vector in units of macroblocks and motion vectors in units of subblocks with a simpler arrangement. As a consequence, the motion vector detection accuracy can be improved without increasing the operation time.

Second Embodiment

The second embodiment of the present invention will be described below. It is the second object of the present invention to provide a vector detecting apparatus capable of increasing the motion vector detection accuracy without increasing the motion search operation amount not only in coding methods such as H. 263 and MPEG4 described above but also in other coding methods, such as H. 261, MPEG1 and MPEG2, which do not use motion vectors in units of subblocks. To this end, the present invention proposes the second embodiment to be described below.

As described above, if a search range is simply expanded to increase the motion vector detection accuracy, the number of candidate vectors increases accordingly, resulting in increase of the motion search operation amount. In the second embodiment, therefore, while a search range is expanded, candidate blocks in the range are selected to suppress an increase in the number of candidate vectors and also suppress an increase in the time required to detect motion vectors.

Figure 7A:
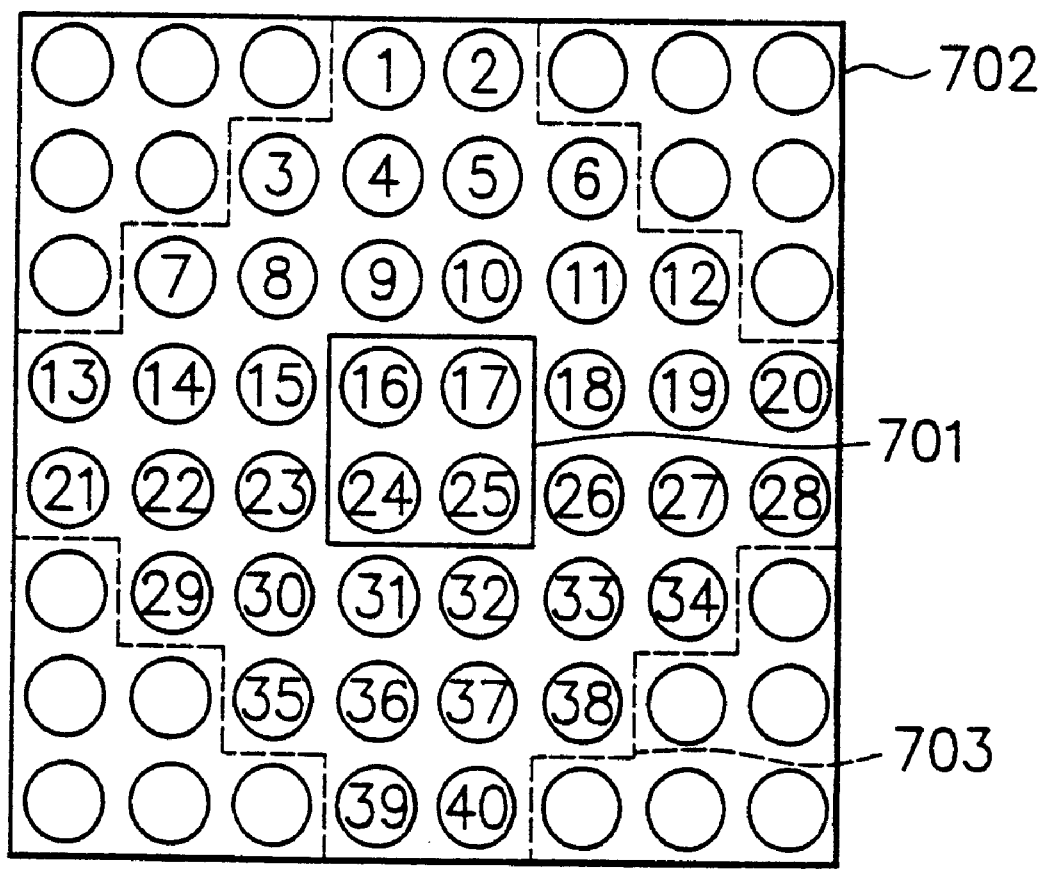
FIGS. 7A and 7B are views for explaining one characteristic feature of a motion vector detecting apparatus according to the second embodiment of the present invention.
Figure 7B:
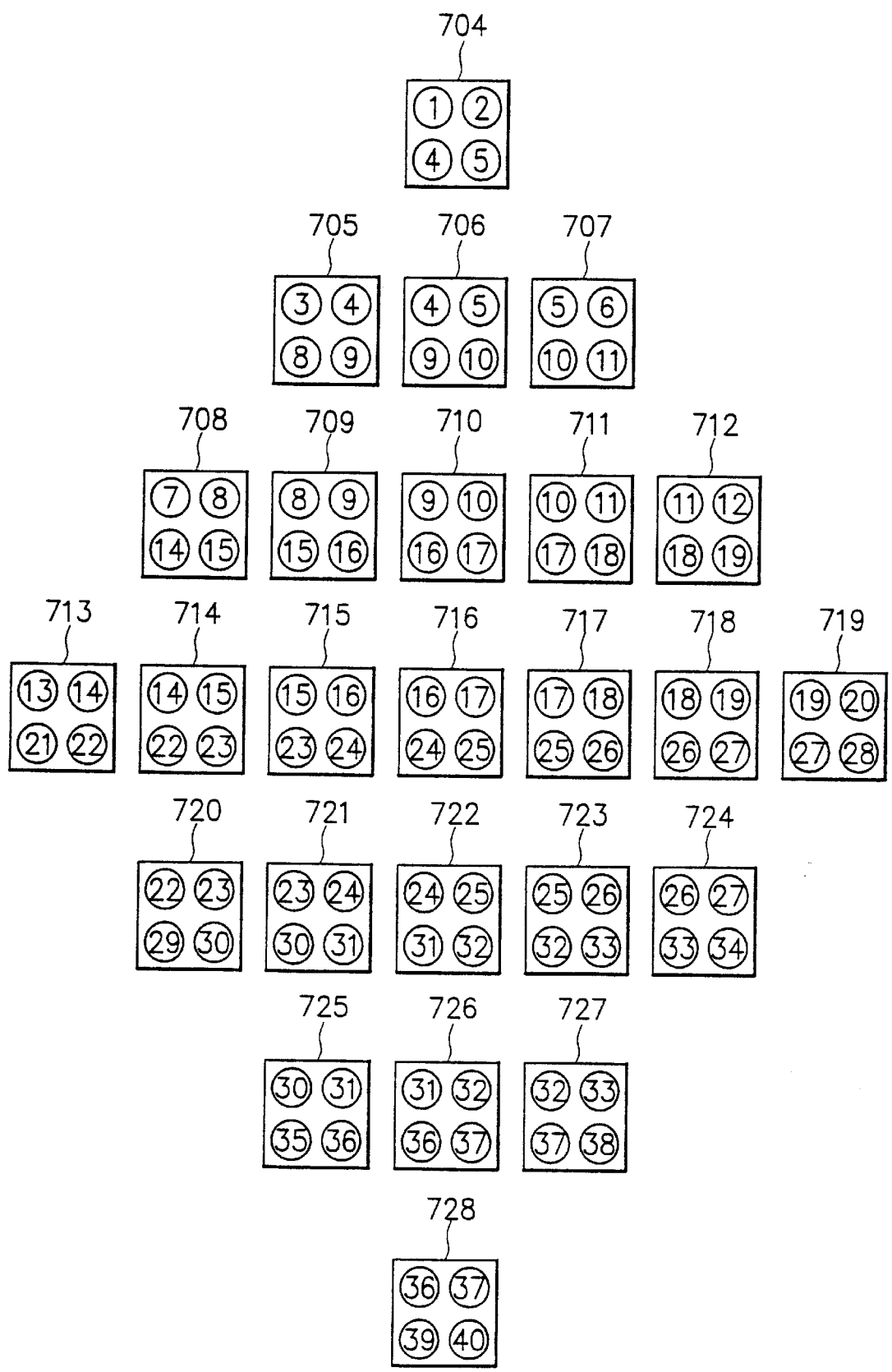

FIGS. 7A and 7B show a case in which the search range having 6×6 pixels shown in FIG. 4A is expanded to a search range having 8×8 pixels (the search range is expanded by +3 pixels in each of upper, lower, left and right directions from a coding target block), and blocks far from the coding target block are excluded from candidate blocks instead.

In FIGS. 7A and 7B, reference numeral 701 denotes the position of a 2×2-pixel coding target block in a coding target frame; 702, an 8×8-pixel search range in an immediately preceding reference frame. A range 703 enclosed with the dotted lines is an actual motion vector search range from which the blocks far from the coding target block 701 are excluded. Reference numerals 704 to 728 denote blocks corresponding to all candidate vectors in the motion vector search range 703. Each number in the circles indicates a pixel number.

Figure 8B:
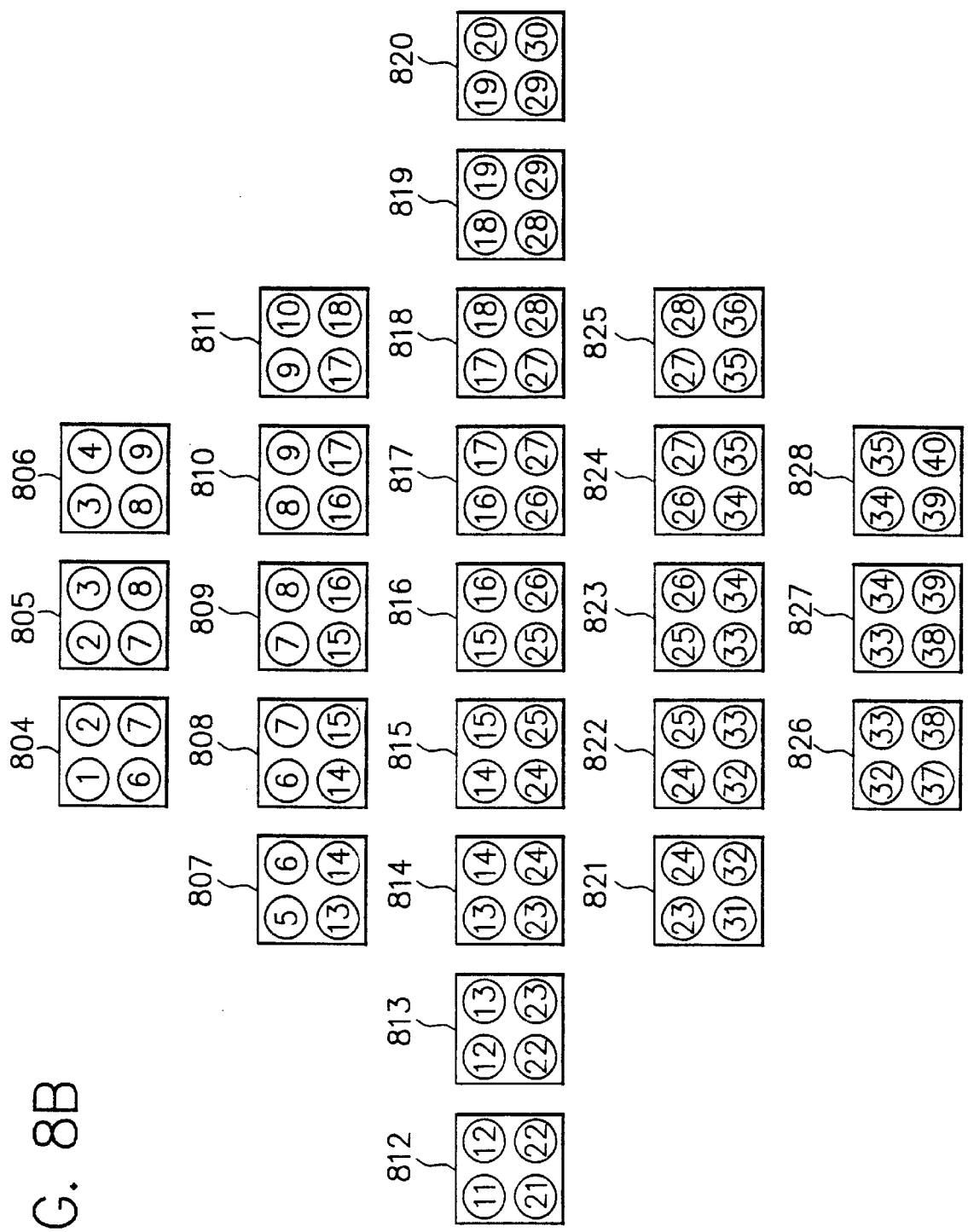

FIGS. 8A and 8B show a case in which the search range in FIG. 4A is expanded by +4 pixels in each of left and right directions from a coding target block by weighting against the horizontal direction of the search range, and blocks far from the coding target block are excluded from candidate blocks instead. That is, when a camera is used to obtain image data, the camera is often moved horizontally, and an image display screen itself is oblong. Consequently, the image correlation is higher in the horizontal direction. The example shown in FIG. 8A and 8B is based on this fact.

In FIGS. 8A and 8B, reference numeral 801 denotes the position of a 2×2-pixel coding target block in a coding target frame; and 802, a 6×10-pixel search range in an immediately preceding reference frame. A range 803 enclosed with the dotted lines is an actual motion vector search range from which the blocks far from the coding target block 801 are excluded. Reference numerals 804 to 828 denote blocks corresponding to all candidate vectors in the motion vector search range 803. Each number in the circles indicates a pixel number.

In the examples shown in FIGS. 7A, 7B, 8A and 8B, a search range for detecting motion vectors is expanded, and candidate blocks in the range are selected instead to decrease the number of candidate blocks to 25 as in the example in FIGS. 4A and 4B. Consequently, the motion vector detection accuracy can be increased by expanding the search range without increasing the motion search operation amount.

The arrangement of a motion vector detecting apparatus according to the second embodiment capable of processing a motion vector search range which is neither a square nor a rectangle as described above will be described below.

Figure 9:
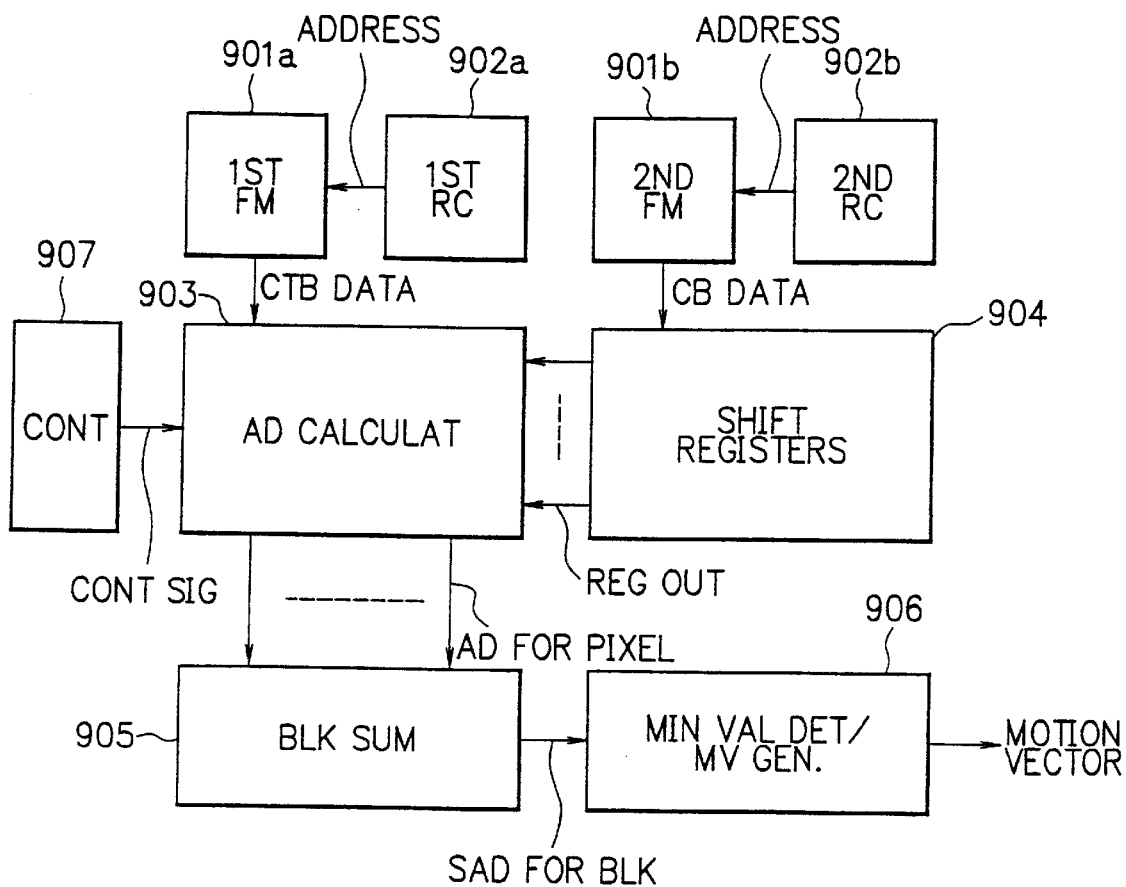
FIG. 9 is a block diagram showing the arrangement of main part of the motion vector detecting apparatus according to the second embodiment of the present invention.

FIG. 9 is a block diagram showing the arrangement of main part of the motion vector detecting apparatus according to the second embodiment. For the sake of simplicity, it is assumed that, as shown in FIG. 10A, a coding target block has 4×4 pixels, a search range has +4 pixels in each of upper, lower, left and right directions in addition to the coding target block (i.e., the search range is wider than that shown in FIGS. 5A and 5B in which +2 pixels in these four directions are added), and blocks far from the coding target block are excluded from candidates.

Figure 10B:
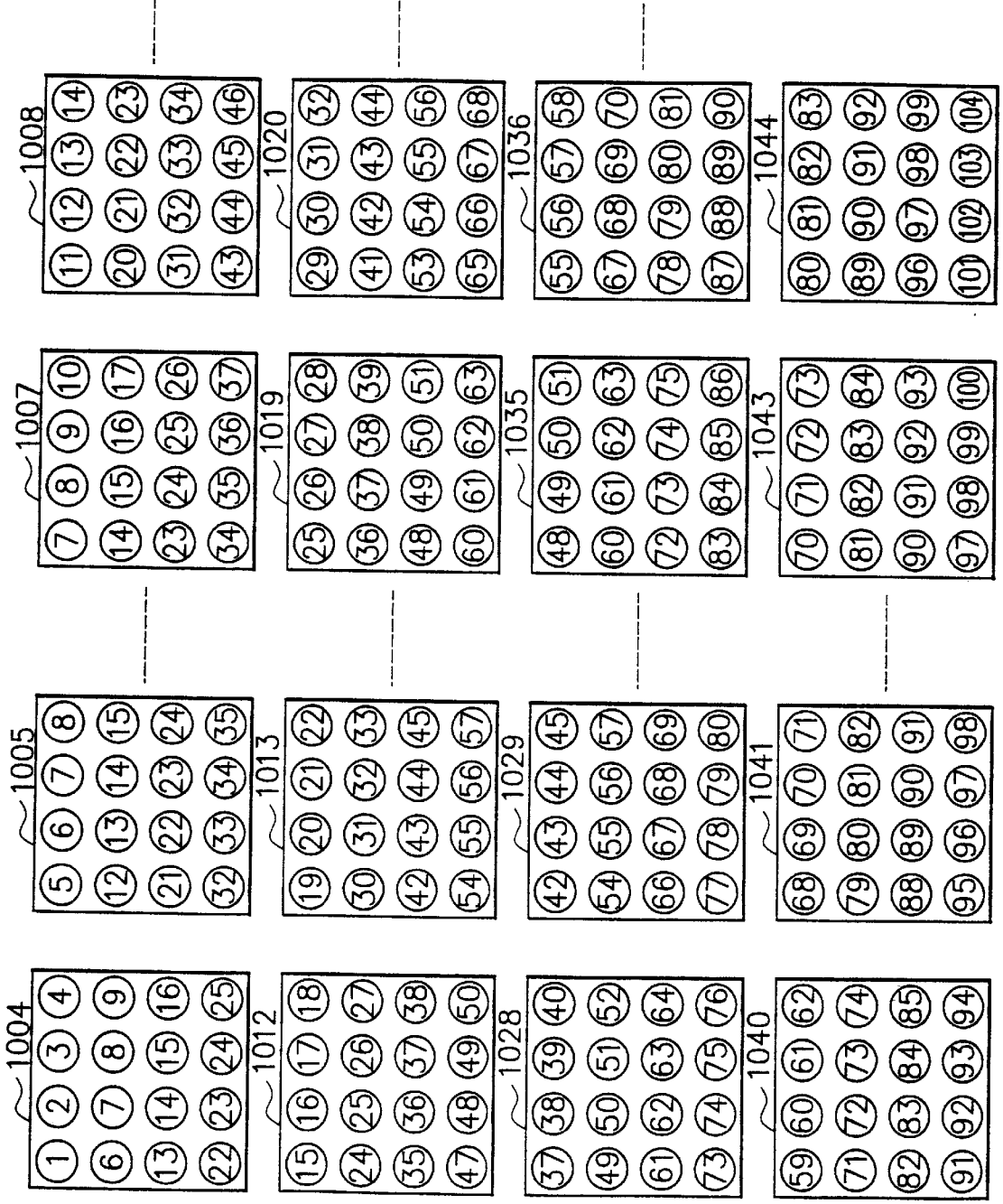

In FIGS. 10A and 10B, reference numeral 1001 denotes a coding target block in a coding target frame; 1002, an expanded search range in an immediately preceding reference frame, which has +4 pixels in each of upper, lower, left and right directions in addition to the coding target block.

A range 1003 enclosed with the dotted lines is an actual motion vector search range from which the blocks far from the coding target block 1001 are excluded from candidates in the expanded search range 1002. Reference numerals 1004 to 1044 denote blocks corresponding to all candidate vectors in the motion vector search range 1003. Note that when a "search range" is simply mentioned in the following description, this search range means the actual motion vector search range 1003 in which distant blocks are excluded from candidates.

In FIG. 9, reference numerals 901a and 901b denote frame memories; 902a and 902b, read circuits; 903, an absolute difference calculating circuit; 904, a shift register set; 905, a block summing circuit; 906, a minimum value determining/motion vector generating circuit; and 907, a control circuit.

An image of a coding target frame is stored in the first frame memory 901a. From this image, pixel values (to be referred to as coding target block data hereinafter) of a coding target block are read out in accordance with output addresses from the first read circuit 902a and supplied to the absolute difference calculating circuit 903. Also, an image of an immediately preceding reference frame of the coding target frame is stored in the second frame memory 901b. From this image, pixel values (to be referred to as search data hereinafter) in a search range are read out in accordance with output addresses from the second read circuit 902b and supplied to the shift register set 904.

Figure 11:
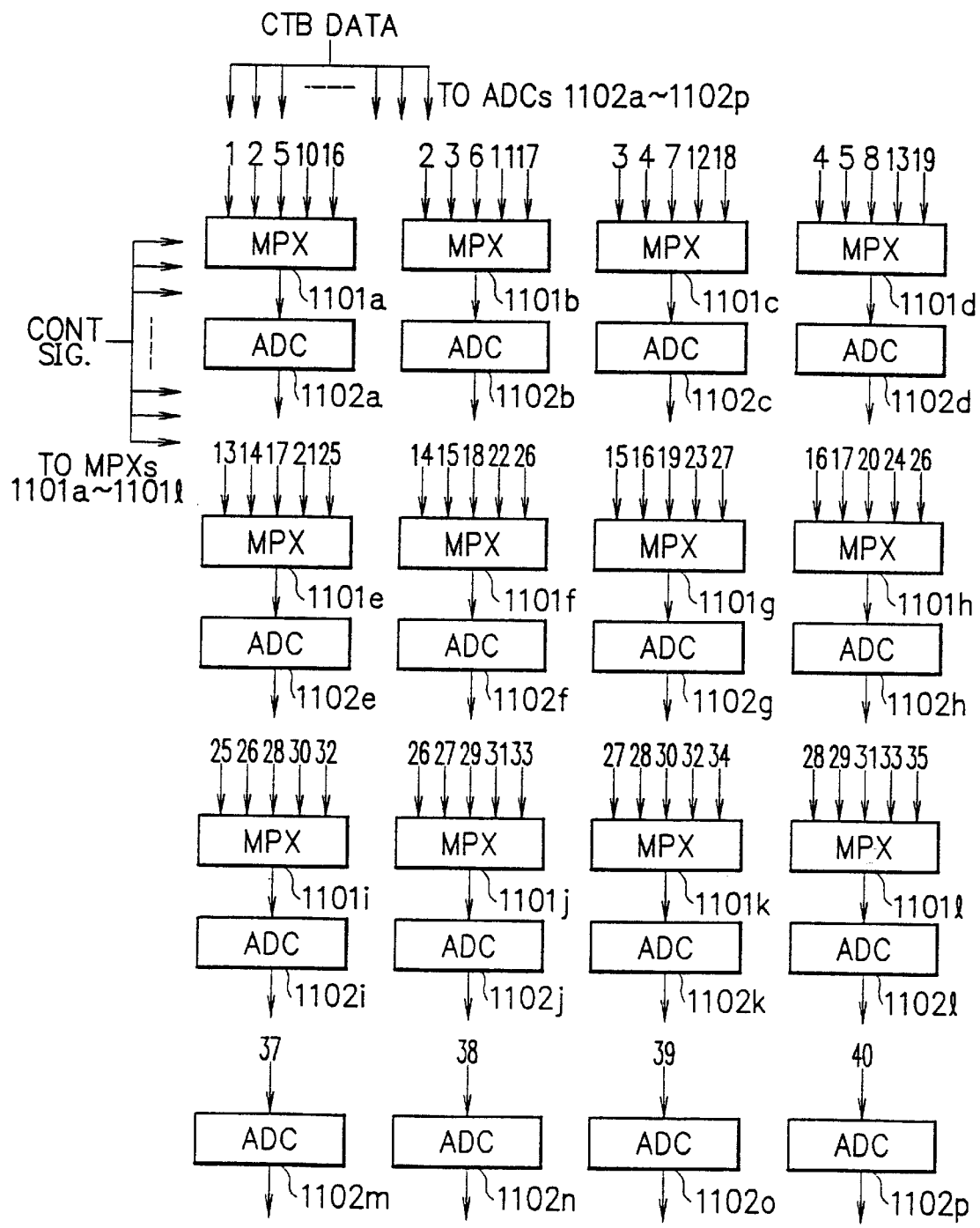
FIG. 11 is a view showing the arrangement of an absolute difference calculating circuit shown in FIG. 9.

FIG. 11 shows the internal arrangement of the absolute difference calculating circuit 903. In FIG. 11, reference numerals 1101a to 1101l denote multiplexers (to be referred to as MPXs hereinafter); and 1102a to 1102p, pixel absolute difference calculating circuits (to be referred to as ADCs hereinafter). The positions of the ADCs 1102a to 1102p correspond to the positions of pixels in a coding target block in an actual frame, i.e., the position of the coding target block 1001 in FIG. 10A.

A plurality of output signals from the shift register set 904 are input to the input terminals of the MPXs 1101a to 1101l, and one of these signals is selected. Output selection signals from the MPXs 1101a to 1101l are input to the ADCs 1102a to 1102l, respectively. These MPXs 1101a to 1101l can be switched in accordance with a control signal from the control circuit 907.

Of the sixteen ADCs 1102a to 1102p, each of the twelve ADCs 1102a to 1102l calculates, for each pixel, the absolute difference between the output signal (search data) from the shift register set 904 selected by a corresponding one of the MPXs 1101a to 1101l and the coding target block data read out from the first frame memory 901a, and supplies the calculation result to the block summing circuit 905.

The output signals (search data) from the shift register set 904 are directly input to the input terminals of the four remaining ADCs 1102m to 1102p. Each of these four ADCs 1102m to 1102p calculates, for each pixel, the absolute difference between the search data directly input from the shift register set 904 and the coding target block data read out from the first frame memory 901a and supplies the calculation result to the block summing circuit 905.

Figure 12:
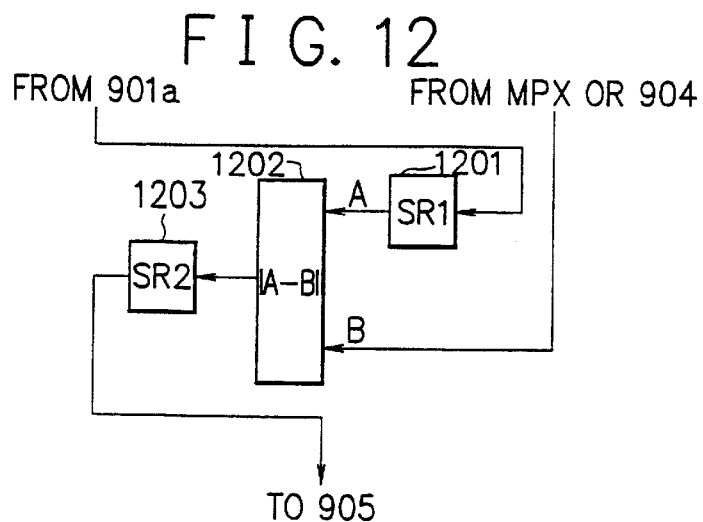
FIG. 12 is a view showing the arrangement of a pixel absolute difference calculating circuit (ADC) shown in FIG. 11.

FIG. 12 shows the internal arrangement of the ADCs 1102a to 1102p. In FIG. 12, reference numerals 1201 and 1203 denote shift registers; and 1202, a calculating circuit. The first shift register 1201 holds one pixel of the coding target block data read out from the first frame memory 901a.

The calculating circuit 1202 calculates an absolute difference |A−B| between one-pixel coding target block data A held in the first shift register 1201 and one-pixel search data B input from the MPXs 1101a to 1101l or the shift register set 904, and holds the calculation result in the second shift register 1203. The one-pixel absolute difference held in the second shift register 1203 is output to the block summing circuit 905.

Figure 13:
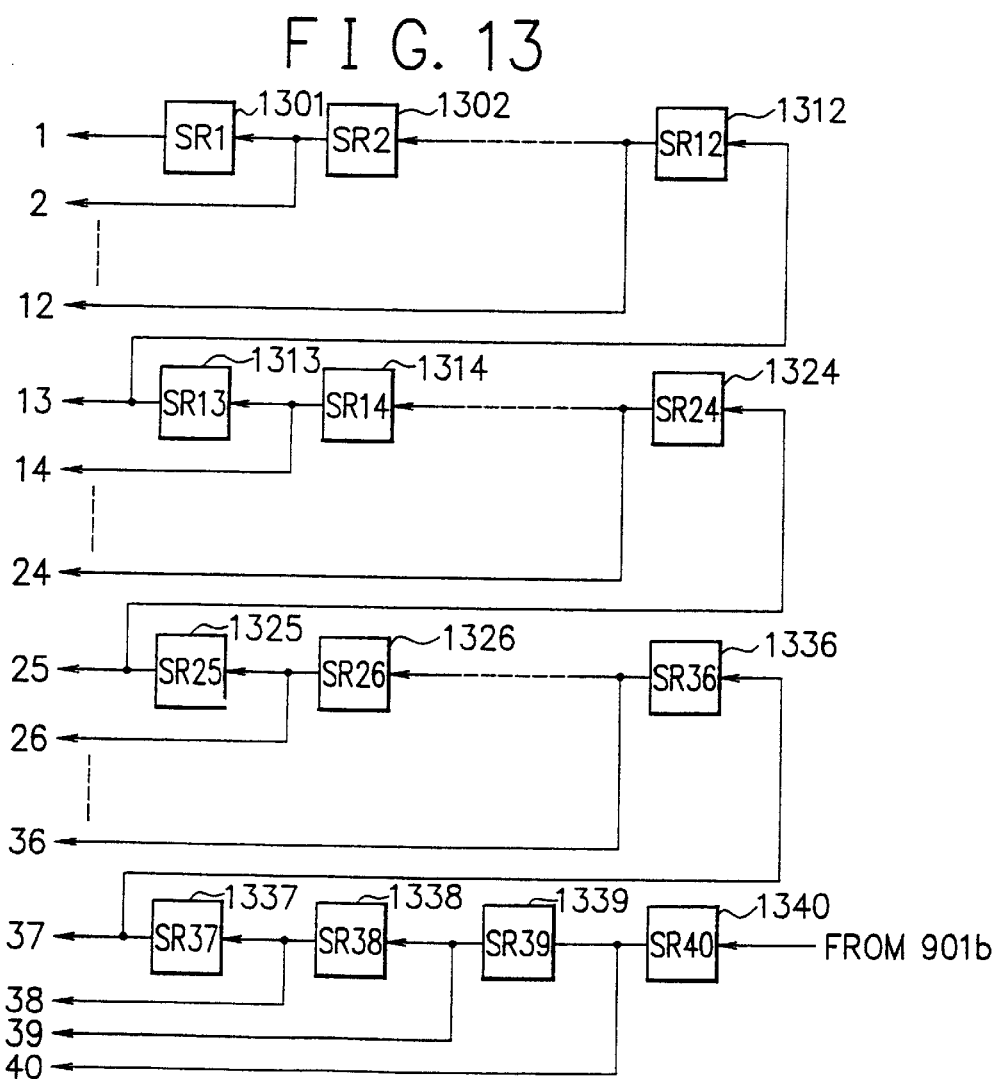
FIG. 13 is a view showing the arrangement of a shift register set shown in FIG. 9.

FIG. 13 shows the internal arrangement of the shift register set 904. In FIG. 13, reference numerals 1301 to 1340 denote shift registers, and these forty shift registers 1301 to 1340 are connected in series. In the arrangement shown in FIG. 13, the thirty-six shift registers 1301 to 1336 are divided into three lines so that twelve (corresponding to the maximum number in the horizontal direction of the search range 1003) registers are arranged in each line. The four remaining shift registers 1337 to 1340 are arranged in the lowermost line.

Since the shift register set 904 has the above arrangement, the search data read out in units of pixels from the second frame memory 901b is sequentially transferred from right to left in each line. Output search data from the shift registers 1313, 1325 and 1337 at the leftmost positions in the second and subsequent lines are respectively supplied to the rightmost positions in their upper lines. Consequently, the input search data is sequentially transferred from the lower right shift register 1340 to the upper left shift register 1301.

Additionally, while the search data is sequentially transferred, the outputs from the shift registers 1301 to 1340 are independently extracted and supplied to the input terminals of the MPXs 1101a to 1101l and the ADCs 1102m to 1102p in the absolute difference calculating circuit 903 shown in FIG. 11. Numbers 1 to 40 attached to the outputs of the shift registers 1301 to 1340 in the order from the rearmost stages in FIG. 13 correspond to numbers 1 to 40 in FIG. 11. That is, the outputs from the shift registers 1301 to 1340 are input to the input terminals respectively having the corresponding numbers of the MPXs 1101a to 1101l and the ADCs 1102m to 1102p.

The block summing circuit 905 calculates the SAD of pixels calculated by the ADCs 1102a to 1102p and supplies the result to the minimum value determining/motion vector generating circuit 906. The minimum value determining/motion vector generating circuit 906 determines the minimum value of the SAD supplied in units of candidate blocks from the block summing circuit 905. The minimum value determining/motion vector generating circuit 906 generates a motion vector with adoption of a candidate block having the minimum sum to be a reference block.

The operation of the motion vector detecting apparatus according to this embodiment with the above arrangement will be described below.

First, coding target block data from the first frame memory 901a is input to the absolute difference calculating circuit 903, and the data of each pixel is held in the first shift register 1201 in a corresponding one of the ADCs 1102a to 1102p. This coding target block data is kept held in the first shift register 1201 during processing of the same block.

Note that it is only necessary to completely input the coding target block data from the first frame memory 901a before search data corresponding to the first candidate block is completely input to the shift register set 904 in search data input processing described below.

Next, search data is input from the second frame memory 901b to the shift register set 904. In this embodiment, the data in the search range 1003 shown in FIG. 10A is read out in units of pixels from the uppermost line to the lowermost line in the horizontal direction and from left to right in each line and input to the shift register set 904. That is, the data is input in the order of pixel numbers 1 to 104 shown in FIG. 10A.

FIGS. 14A–14I show the way the state of the shift register set 904 transits when the search data input processing as above is continued from pixel numbers 1 to 104.

In FIGS. 14A–14I, square boxes correspond to the shift registers 1301 to 1340 in FIG. 13. A number above the oblique line in each box indicates the number of a shift register, and a number below the oblique line indicates the pixel number of input search data.

That is, as shown in FIGS. 11 and 13, the outputs of the four shift registers 1337 to 1340 closer to the input stage are connected to the ADCs 1102m to 1102p, respectively. Reference numerals 1401 to 1409 corresponding to FIGS. 14A–14I indicate states in which effective search data (search data in a block usable as the candidate blocks 1004 to 1044 in the search range 1003) is held in these shift registers.

These states will be described blow on the basis of the correspondence with FIGS. 10A and 10B. That is, a condition to perform calculations for the candidate block 1004 is ready as in the state 1401, and a condition to perform calculations for the candidate block 1005 is ready as in the state 1402. Analogously, conditions to perform calculations for the candidate blocks 1008, 1013, 1020, 1029, 1036, 1041 and 1044 are ready as in the states 1403, 1404, 1405, 1406, 1407, 1408 and 1409, respectively.

Also, shift registers in four consecutive boxes enclosed with the thick lines in FIGS. 14A–14I indicate shift registers for holding search data to be input to four horizontally consecutive ADCs, i.e., the ADCs 1102a to 1102d, 1102e to 1102h, 1102i to 1102l and 1102m to 1102p. In the state 1401, for example, search data of pixel numbers 1 to 4, 6 to 9, 13 to 16 and 22 to 25 are input from the shift registers 1316 to 1319, 1321 to 1324, 1328 to 1331 and 1337 to 1340 to the ADCs 1102a to 1102p.

As is apparent from FIGS. 14A–14I, shift registers for holding search data to be input to the four ADCs 1102m to 1102p are fixed to the four shift registers 1337 to 1340 closer to the input stage in FIG. 13 (accordingly, no corresponding MPXs are provided). On the other hand, shift registers for holding search data to be input to the other ADCs 1102a to 1102l are not fixed, i.e., can be any of the thirty-six remaining shift registers 1301 to 1336 (therefore, the corresponding MPXs 1101a to 1101l are provided).

Figures 14A, 14B, 14C:
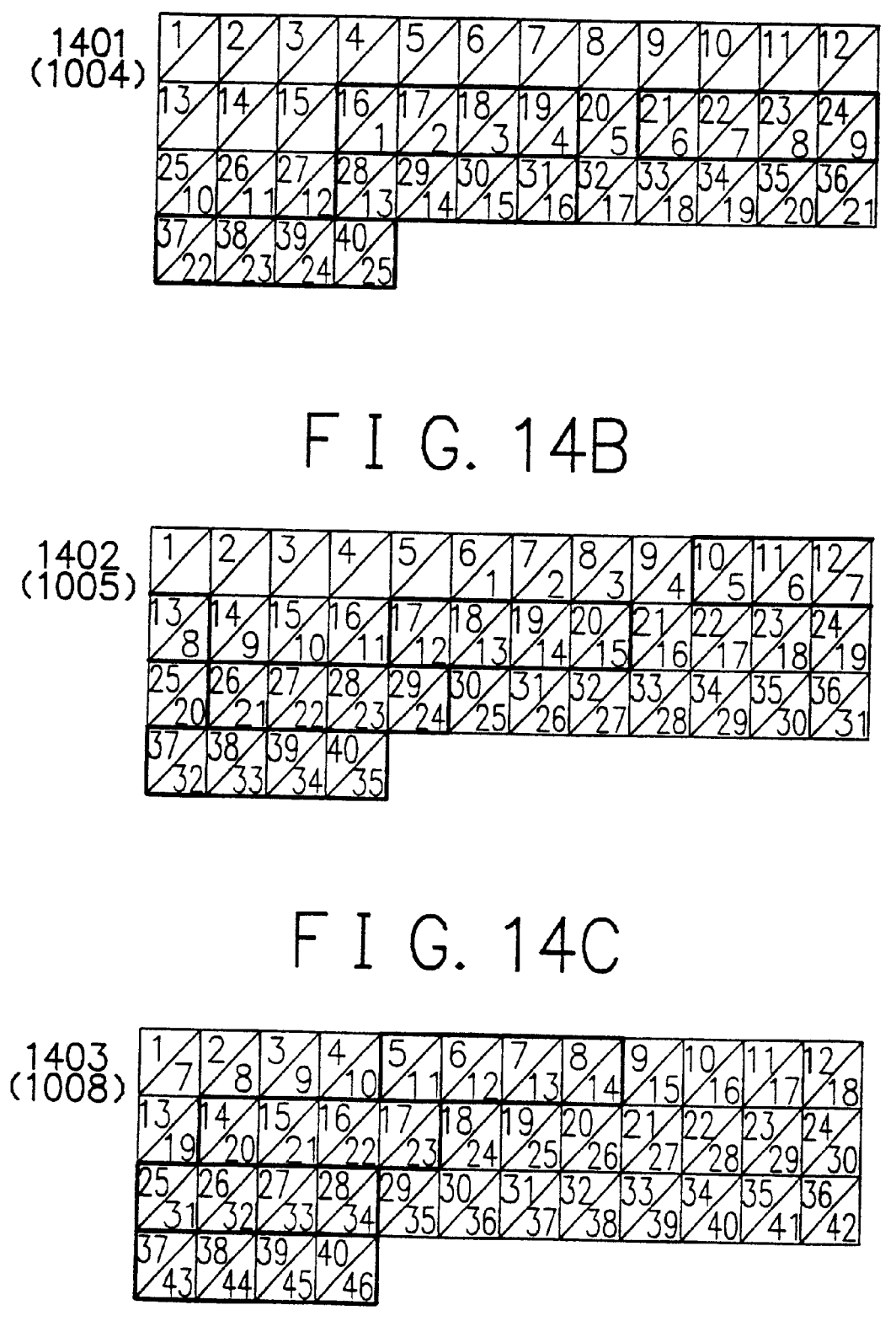

That is, when the search data is read out in units of pixels from the second frame memory 901b and sequentially input to the shift register set 904, the state 1401 in FIG. 14A is reached at the time the search data of twenty-five pixels of pixel numbers 1 to 25 are read out. At this timing, all search data are complete to perform absolute difference calculations for the candidate block 1004. For example, shift registers for holding search data to be input to the ADCs 1102a to 1102d are the shift registers 1316 to 1319.

Accordingly, the control circuit 907 generates a control signal so that an output (of number 16) from the shift register 1316 is chosen as an output from the MPX 1101a. Also, the control circuit 907 generates control signals so that outputs (of numbers 17 to 19) from the shift registers 1317 to 1319 are chosen as outputs from the MPXs 1101b to 1101d, respectively.

In the state 1401 shown in FIG. 14A, shift registers for holding search data to be input to the ADCs 1102e to 1102h are the shift registers 1321 to 1324. Therefore, the control circuit 907 generates control signals so that outputs (of numbers 21 to 24) from the shift registers 1321 to 1324 are selected as outputs from the MPXs 1101e to 1101h, respectively.

Additionally, shift registers for holding search data to be input to the ADCs 1102i to 1102l are the shift registers 1328 to 1331. Therefore, the control circuit 907 generates control signals so that outputs (of numbers 28 to 31) from the shift registers 1328 to 1331 are selected as outputs from the MPXs 1101i to 1101l, respectively.

The calculating circuit 1202 in each of the ADCs 1102a to 1102p calculates the absolute difference between the coding target block data and the search data for each pixel, and the second shift register 1203 holds the calculation result. These absolute difference are input to and summed by the block summing circuit 905, thereby obtaining the SAD in units of blocks. The SAD in units of blocks thus calculated is input to the minimum value determining/motion vector generating circuit 906 and held in an internal register (not shown).

No absolute difference calculation is performed in the next nine clocks (during which the search data of nine pixels from pixel number 26 is newly input, i.e., the state 1401 in FIG. 14A transits to the state 1402 in FIG. 14B). Therefore, the selected states of the MPXs 1101a to 1101l are disregarded (don't care). However, when the state 1402 is reached, all search data are complete to perform absolute difference calculations for the next candidate block 1005. For example, shift registers for holding search data to be input to the ADCs 1102a to 1102d are the shift registers 1310 to 1313.

Accordingly, the control circuit 907 generates a control signal so that an output (of number 10) from the shift register 1310 is chosen as an output from the MPX 1101a. Also, the control circuit 907 generates control signals so that outputs (of numbers 11 to 13) from the shift registers 1311 to 1313 are chosen as outputs from the MPXs 1101b to 1101d, respectively.

In the state 1402 shown in FIG. 14B, shift registers for holding search data to be input to the ADCs 1102e to 1102h are the shift registers 1317 to 1320. Therefore, the control circuit 907 generates control signals so that outputs (of numbers 17 to 20) from the shift registers 1317 to 1320 are selected as outputs from the MPXs 1101e to 1101h, respectively.

Additionally, shift registers for holding search data to be input to the ADCs 1102i to 1102l are the shift registers 1326 to 1329. Therefore, the control circuit 907 generates control signals so that outputs (of numbers 26 to 29) from the shift registers 1326 to 1329 are selected as outputs from the MPXs 1101i to 1101l, respectively.

As in the case described above, the calculating circuit 1202 in each of the ADCs 1102a to 1102p and the block summing circuit 905 calculate the SAD in units of blocks and input the SAD to the minimum value determining/motion vector generating circuit 906. The minimum value determining/motion vector generating circuit 906 compares the presently input SAD with the SAD held in the internal register (not shown) in the immediately preceding processing, and holds the smaller value in the register. This processing is similarly performed for all the subsequent candidate blocks.

In the subsequent two clocks, all search data are complete to perform absolute difference calculations for the candidate blocks 1006 and 1007. Since the selected states of the MPXs 1101a to 1101l can remain unchanged, the control circuit 907 holds the same control signal states as for the candidate block 1005 described above.

Since no absolute difference calculation is performed in the next eight clocks, the selected states of the MPXs 1101a to 1101l are disregarded. However, when the state 1403 is reached, all search data are complete to perform absolute difference calculations for the next candidate block 1008. For example, shift registers for holding search data to be input to the ADCs 1102a to 1102d are the shift registers 1305 to 1308.

Accordingly, the control circuit 907 generates a control signal so that an output (of number 5) from the shift register 1305 is chosen as an output from the MPX 1101a. Also, the control circuit 907 generates control signals so that outputs (of numbers 6 to 8) from the shift registers 1306 to 1308 are chosen as outputs from the MPXs 1101b to 1101d, respectively.

In the state 1403 shown in FIG. 14C, shift registers for holding search data to be input to the ADCs 1102e to 1102h are the shift registers 1314 to 1317. Therefore, the control circuit 907 generates control signals so that outputs (of numbers 14 to 17) from the shift registers 1314 to 1317 are selected as outputs from the MPXs 1101e to 1101h, respectively.

Additionally, shift registers for holding search data to be input to the ADCs 1102i to 1102l are the shift registers 1325 to 1328. Therefore, the control circuit 907 generates control signals so that outputs (of numbers 25 to 28) from the shift registers 1325 to 1328 are selected as outputs from the MPXs 1101i to 1101l, respectively.

In the subsequent four clocks, all search data are complete to perform absolute difference calculations for the candidate blocks 1009 to 1012. Since the selected states of the MPXs 1101a to 1101l can remain unchanged, the control circuit 907 holds the same control signal states as for the candidate block 1008 described above.

Since no absolute difference calculation is performed in the next six clocks, the selected states of the MPXS 1101a to 1101l are disregarded. However, when the state 1404 is reached, all search data are complete to perform absolute difference calculations for the next candidate block 1013. For example, shift registers for holding search data to be input to the ADCs 1102a to 1102d are the shift registers 1302 to 1305.

Accordingly, the control circuit 907 generates a control signal so that an output (of number 2) from the shift register 1302 is chosen as an output from the MPX 1101a. Also, the control circuit 907 generates control signals so that outputs (of numbers 3 to 5) from the shift registers 1303 to 1305 are chosen as outputs from the MPXs 1101b to 1101d, respectively.

Figures 14D, 14E, 14F:
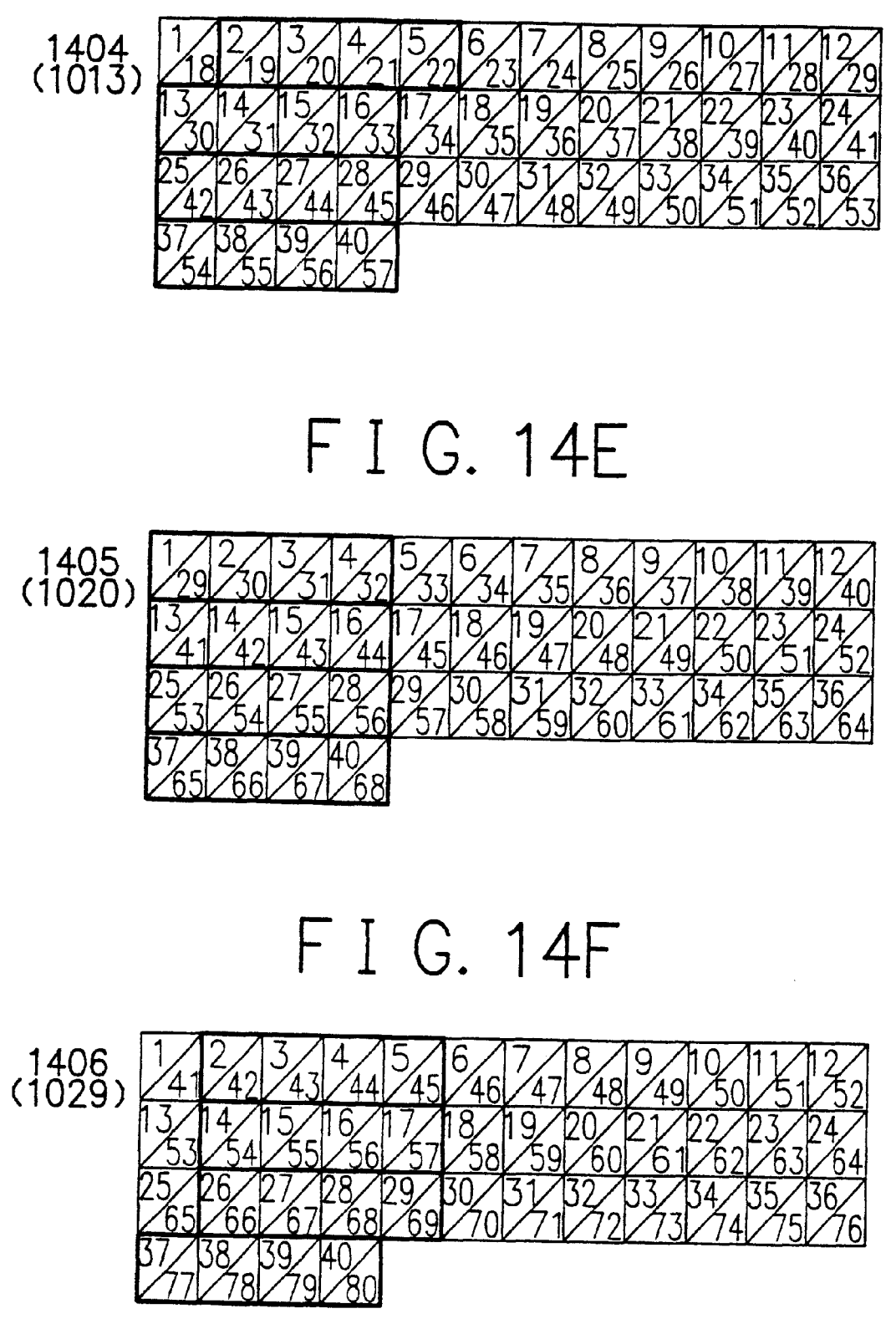

In the state 1404 shown in FIG. 14D, shift registers for holding search data to be input to the ADCs 1102e to 1102h are the shift registers 1313 to 1316. Therefore, the control circuit 907 generates control signals so that outputs (of numbers 13 to 16) from the shift registers 1313 to 1316 are selected as outputs from the MPXs 1101e to 1101h, respectively.

Additionally, shift registers for holding search data to be input to the ADCs 1102i to 1102l are the shift registers 1325 to 1328. Therefore, the control circuit 907 generates control signals so that outputs (of numbers 25 to 28) from the shift registers 1325 to 1328 are selected as outputs from the MPXs 1101i to 1101l, respectively.

In the subsequent six clocks, all search data are complete to perform absolute difference calculations for the candidate blocks 1014 to 1019. Since the selected states of the MPXs 1101a to 1101l can remain unchanged, the control circuit 907 holds the same control signal states as for the candidate block 1013 described above.

Since no absolute difference calculation is performed in the next four clocks, the selected states of the MPXs 1101a to 1101l are disregarded. However, when the state 1405 is reached, all search data are complete to perform absolute difference calculations for the next candidate block 1020. For example, shift registers for holding search data to be input to the ADCs 1102a to 1102d are the shift registers 1301 to 1304.

Accordingly, the control circuit 907 generates a control signal so that an output (of number 1) from the shift register 1301 is chosen as an output from the MPX 1101a. Also, the control circuit 907 generates control signals so that outputs (of numbers 2 to 4) from the shift registers 1302 to 1304 are chosen as outputs from the MPXs 1101b to 1101d, respectively.

In the state 1405 shown in FIG. 14E, shift registers for holding search data to be input to the ADCs 1102e to 1102h are the shift registers 1313 to 1316. Therefore, the control circuit 907 generates control signals so that outputs (of numbers 13 to 16) from the shift registers 1313 to 1316 are selected as outputs from the MPXs 1101e to 1101h, respectively.

Additionally, shift registers for holding search data to be input to the ADCs 1102i to 1102l are the shift registers 1325 to 1328. Therefore, the control circuit 907 generates control signals so that outputs (of numbers 25 to 28) from the shift registers 1325 to 1328 are selected as outputs from the MPXs 1101i to 1101l, respectively.

In the subsequent eight clocks, all search data are complete to perform absolute difference calculations for the candidate blocks 1021 to 1028. Since the selected states of the MPXs 1101a to 1101l can remain unchanged, the control circuit 907 holds the same control signal states as for the candidate block 1020 described above.

Since no absolute difference calculation is performed in the next three clocks, the selected states of the MPXs 1101a to 1101l are disregarded. However, when the state 1406 is reached, all search data are complete to perform absolute difference calculations for the next candidate block 1029. For example, shift registers for holding search data to be input to the ADCs 1102a to 1102d are the shift registers 1302 to 1305.

Accordingly, the control circuit 907 generates a control signal so that an output (of number 2) from the shift register 1302 is chosen as an output from the MPX 1101a. Also, the control circuit 907 generates control signals so that outputs (of numbers 3 to 5) from the shift registers 1303 to 1305 are chosen as outputs from the MPXs 1101b to 1101d, respectively.

In the state 1406 shown in FIG. 14F, shift registers for holding search data to be input to the ADCs 1102e to 1102h are the shift registers 1314 to 1317. Therefore, the control circuit 907 generates control signals so that outputs (of numbers 14 to 17) from the shift registers 1314 to 1317 are selected as outputs from the MPXs 1101e to 1101h, respectively.

Additionally, shift registers for holding search data to be input to the ADCs 1102i to 1102l are the shift registers 1326 to 1329. Therefore, the control circuit 907 generates control signals so that outputs (of numbers 26 to 29) from the shift registers 1326 to 1329 are selected as outputs from the MPXs 1101i to 1101l, respectively.

In the subsequent six clocks, all search data are complete to perform absolute difference calculations for the candidate blocks 1030 to 1035. Since the selected states of the MPXs 1101a to 1101l can remain unchanged, the control circuit 907 holds the same control signal states as for the candidate block 1029 described above.

Since no absolute difference calculation is performed in the next three clocks, the selected states of the MPXs 1101a to 1101l are disregarded. However, when the state 1407 is reached, all search data are complete to perform absolute difference calculations for the next candidate block 1036. For example, shift registers for holding search data to be input to the ADCs 1102a to 1102d are the shift registers 1305 to 1308.

Accordingly, the control circuit 907 generates a control signal so that an output (of number 5) from the shift register 1305 is chosen as an output from the MPX 1101a. Also, the control circuit 907 generates control signals so that outputs (of numbers 6 to 8) from the shift registers 1306 to 1308 are chosen as outputs from the MPXs 1101b to 1101d, respectively.

Figures 14G, 14H, 14I:
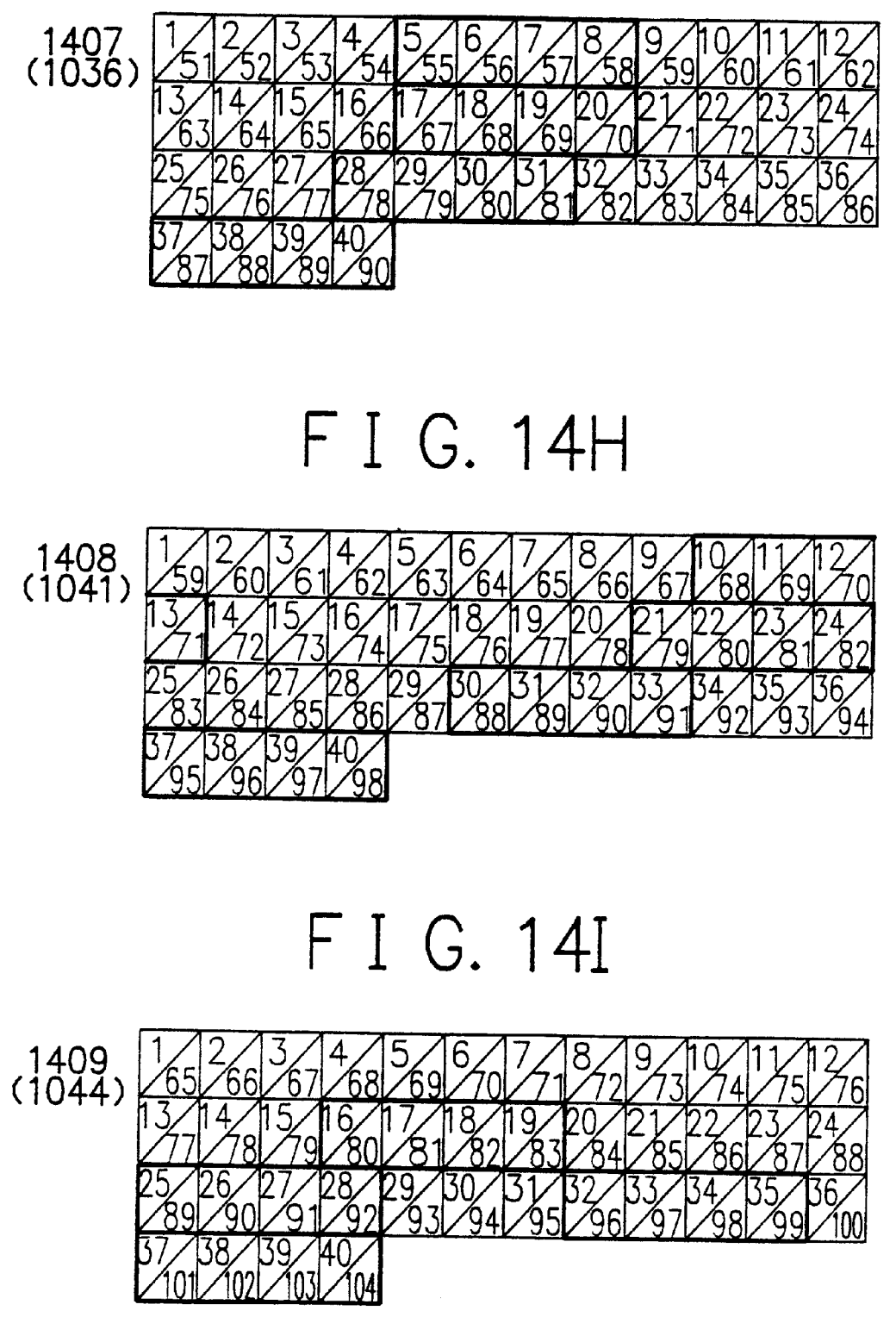

In the state 1407 shown in FIG. 14G, shift registers for holding search data to be input to the ADCs 1102e to 1102h are the shift registers 1317 to 1320. Therefore, the control circuit 907 generates control signals so that outputs (of numbers 17 to 20) from the shift registers 1317 to 1320 are selected as outputs from the MPXs 1101e to 1101h, respectively.

Additionally, shift registers for holding search data to be input to the ADCs 1102i to 1102l are the shift registers 1328 to 1331. Therefore, the control circuit 907 generates control signals so that outputs (of numbers 28 to 31) from the shift registers 1328 to 1331 are selected as outputs from the MPXs 1101i to 1101l, respectively.

In the subsequent four clocks, all search data are complete to perform absolute difference calculations for the candidate blocks 1037 to 1040. Since the selected states of the MPXs 1101a to 1101l can remain unchanged, the control circuit 907 holds the same control signal states as for the candidate block 1036 described above.

Since no absolute difference calculation is performed in the next three clocks, the selected states of the MPXs 1101a to 1101l are disregarded. However, when the state 1408 is reached, all search data are complete to perform absolute difference calculations for the next candidate block 1041. For example, shift registers for holding search data to be input to the ADCs 1102a to 1102d are the shift registers 1310 to 1313.

Accordingly, the control circuit 907 generates a control signal so that an output (of number 10) from the shift register 1310 is chosen as an output from the MPX 1101a. Also, the control circuit 907 generates control signals so that outputs (of numbers 11 to 13) from the shift registers 1311 to 1313 are chosen as outputs from the MPXs 1101b to 1101d, respectively.

In the state 1408 shown in FIG. 14H, shift registers for holding search data to be input to the ADCs 1102e to 1102h are the shift registers 1321 to 1324. Therefore, the control circuit 907 generates control signals so that outputs (of numbers 21 to 24) from the shift registers 1321 to 1324 are selected as outputs from the MPXs 1101e to 1101h, respectively.

Additionally, shift registers for holding search data to be input to the ADCs 1102i to 1102l are the shift registers 1330 to 1333. Therefore, the control circuit 907 generates control signals so that outputs (of numbers 30 to 33) from the shift registers 1330 to 1333 are selected as outputs from the MPXs 1101i to 1191l, respectively.

In the subsequent two clocks, all search data are complete to perform absolute difference calculations for the candidate blocks 1042 and 1043. Since the selected states of the MPXs 1101a to 1101l can remain unchanged, the control circuit 907 holds the same control signal states as for the candidate block 1041 described above.

Since no absolute difference calculation is performed in the next three clocks, the selected states of the MPXs 1101a to 1101l are disregarded. However, when the state 1409 is reached, all search data are complete to perform absolute difference calculations for the next candidate block 1044. For example, shift registers for holding search data to be input to the ADCs 1102a to 1102d are the shift registers 1316 to 1319.

Accordingly, the control circuit 907 generates a control signal so that an output (of number 16) from the shift register 1316 is chosen as an output from the MPX 1101a. Also, the control circuit 907 generates control signals so that outputs (of numbers 17 to 19) from the shift registers 1317 to 1319 are chosen as outputs from the MPXs 1101b to 1101d, respectively.

In the state 1409 shown in FIG. 14I, shift registers for holding search data to be input to the ADCs 1102e to 1102h are the shift registers 1325 to 1328. Therefore, the control circuit 907 generates control signals so that outputs (of numbers 25 to 28) from the shift registers 1325 to 1328 are selected as outputs from the MPXs 1101e to 1101h, respectively.

Additionally, shift registers for holding search data to be input to the ADCs 1102i to 1102l are the shift registers 1332 to 1335. Therefore, the control circuit 907 generates control signals so that outputs (of numbers 32 to 35) from the shift registers 1332 to 1335 are selected as outputs from the MPXs 1101i to 1101l, respectively.

By the above operation, absolute difference are calculated for all the candidate blocks 1004 to 1044. The minimum value determining/motion vector generating circuit 906 performs the magnitude comparison and the data update processing to the register as described above each time the SAD is calculated for a candidate block, and finally determines a candidate block having the minimum SAD to be a reference block among other candidate blocks. The minimum value determining/motion vector generating circuit 906 generates a motion vector corresponding to the determined reference block.

In the above operation, the outputs from the shift registers 1309 and 1336 are not used by any of the ADCs 1102a to 1102p. Therefore, it is unnecessary to design the arrangement so that the outputs from these shift registers 1309 and 1336 are independently extracted.

The control circuit 907 controls the series of operations described above, i.e., the read of coding target block data from the first frame memory 901a, the read of search data from the second frame memory 901b, the switching of the MPXs 1101a to 1101l, and the processing in the minimum value determining/motion vector generating circuit 906.

Although the control circuit 907 can be constituted by hardware, the control circuit 907 can also be constituted by a microcomputer including, e.g., a CPU, a ROM and a RAM. If this is the case, a program describing a sequence for performing the series of operations as described above is stored in the ROM, and the CPU operates in accordance with the program stored in the ROM. The ROM storing the working program of the CPU constitutes a recording medium of the present invention.

It is also possible to connect a hard disk to the microcomputer via a peripheral interface and store the working program of the CPU in this hard disk. The working program can be externally supplied to the hard disk. If this is the case, the hard disk and a means for supplying the working program, e.g., a recording medium storing the working program, also constitute the recording medium of the present invention.

As the recording medium for storing the working program, it is possible to use, e.g., a floppy disk, an optical disk, a magnetooptical disk, a CD-ROM, a magnetic tape and a nonvolatile memory card in addition to the ROM and the hard disk.

In this embodiment as described above, in a coding method such as H. 263, H. 263, MPEG1, MPEG2 or MPEG4, while a search range for detecting a motion vector is expanded, candidate blocks to be applied in absolute difference calculations in the range are chosen. Consequently, even though the search range is expanded, it is possible to increase the motion vector detection accuracy and compress the information amount more efficiently without increasing the operation amount (increasing the time required for the operation).

In the above embodiment, a case in which a coding target block and candidate blocks are as shown in FIGS. 10A and 10B for the sake of simplicity. However, the present invention is not limited to the above embodiment. A coding target block is actually constituted by 16×16 pixels in H. 261, H. 263, MPEG1, MPEG2 and MPEG4. Therefore, the ADCs, MPXs and the like need only be constituted in accordance with the number of pixels (in this case, the number of the ADCs is 256 and the number of the MPXs is 240)

Also, the shape of the motion vector search range including candidate blocks is not restricted to a rhombus as shown in FIG. 10A. That is, the search range can take any arbitrary shape.

If a range in which candidate blocks exist is large, it is only necessary to prepare the number of shift registers given by $$n \times (b-1) + a$$

where n is the maximum number (in the above embodiment, 12) in the direction (in the above embodiment, the horizontal direction) in which search data is input, a is the size (in the above embodiment, 4) in the direction along which search data of a coding target block is input, and b is the size (in the above embodiment, 4) in the other direction. Furthermore, if candidate block selection methods are different, it is only necessary to set the numbers of inputs to the MPXs and outputs from the shift registers to be input to the MPXs and control the MPXs in accordance with the individual methods.

In the second embodiment of the present invention as has been explained in detail above, calculations are performed by setting a motion vector search range by excluding regions far from a coding target block from a predetermined rectangular region including the coding target block. Accordingly, even if a search range as a rectangular region is made larger than usual, it is possible to prevent an increase in the number of blocks to be subjected to absolute difference calculations to determine a reference block among candidates in a motion vector search range included in the large rectangular region. Consequently, the motion vector detection accuracy can be increased by expanding the search range without increasing the motion search operation amount.

What is claimed is:

1. A motion vector detecting apparatus for calculating an absolute difference between each pixel value in a coding target block and each pixel value in a block as a candidate for a reference block in a motion vector search range, and generating a motion vector by determining the reference block on the basis of the calculation result, wherein the calculation is performed by setting a range formed by excluding regions far from the coding target block from a predetermined rectangular region including the coding target block as the motion vector search range.

2. An apparatus according to claim 1, wherein a method of coding is one of standards of H. 261, H. 263, MPEG1, MPEG2 and MPEG4.

3. A motion vector detecting apparatus for generating a motion vector by using a block matching method, comprising:

a shift register set in which a plurality of shift registers are connected in series, each pixel value in a motion vector search range is sequentially transferred from the first to the last of said shift registers connected in series, and outputs from said shift registers are independently led out;

a plurality of selecting means provided in a one-to-one correspondence with predetermined pixel positions in a coding target block to receive a plurality of outputs from predetermined shift registers in said shift register set and selectively output one of the inputs;

pixel absolute difference calculating means provided in units of pixels to calculate an absolute difference between each pixel value in the coding target block and each pixel value, supplied from said selecting means and said shift register set, in a block as a candidate for a reference block in the motion vector search range; and control means for controlling said selecting means by a predetermined control signal.

4. An apparatus according to claim 3, further comprising:

block summing means for summing the absolute difference of individual pixels calculated by said pixel absolute difference calculating means; and motion vector generating means for determining the reference block on the basis of the calculation result from said block summing means, and obtaining a motion vector.

5. An apparatus according to claim 3, wherein the motion vector search range within which each pixel value is input to said shift register set is a range formed by excluding regions far from the coding target block from a predetermined rectangular region including the coding target block.

6. An apparatus according to claim 5, wherein the predetermined rectangular region is one of a rectangular region similar to the coding target block and a rectangular region different from the coding target block, and the motion vector search range is a rhombic region inscribed in the rectangular region.

7. An apparatus according to claim 3, further comprising reading means for controlling read of each pixel value in the motion vector search range to be input to said shift register set from an image memory for a reference frame including pixel values in the motion vector search range.

8. In a motion vector detecting apparatus for calculating an absolute difference between each pixel value in a coding target block and each pixel value in a block as a candidate for a reference block in a motion vector search range, and generating a motion vector by determining the reference block on the basis of the calculation result, a computer readable recording medium recording a program for allowing a computer to realize a function of performing the calculation by setting a range formed by excluding regions far from the coding target block from a predetermined rectangular region including the coding target block as the motion vector search range.

9. A medium according to claim 8, wherein said motion vector detecting apparatus comprises a shift register set in which a plurality of shift registers are connected in series, each pixel value in a motion vector search range is sequentially transferred from the first to the last of said shift registers connected in series, and outputs from said shift registers are independently led out, a plurality of selecting means provided in a one-to-one correspondence with predetermined pixel positions in coding target block to receive a plurality of outputs from predetermined shift registers in said shift register set and selectively output one of the inputs, and pixel absolute difference calculating means provided in units of pixels to calculate an absolute difference between each pixel value in the coding target block and each pixel value, supplied from said selecting means and said shift register set, in a block as a candidate for a reference block in the motion vector search range, and said computer readable recording medium records a program for allowing a computer to realize a function of reading out each pixel value in the motion vector search region from an image memory for a reference frame including pixel values in the motion vector search range and inputting the readout pixel value to said shift register set, and controlling the selecting operation by said selecting means by a predetermined control signal.

* * * * *